(12) United States Patent
Lim

(10) Patent No.: US 11,423,867 B2
(45) Date of Patent: Aug. 23, 2022

(54) SIGNAL PROCESSING DEVICE AND IMAGE DISPLAY APPARATUS INCLUDING THE SAME

(71) Applicant: LG Electronics Inc., Seoul (KR)

(72) Inventor: Jungeun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/059,954

(22) PCT Filed: May 29, 2019

(86) PCT No.: PCT/KR2019/006434
§ 371 (c)(1),
(2) Date: Nov. 30, 2020

(87) PCT Pub. No.: WO2019/231235
PCT Pub. Date: Dec. 5, 2019

(65) Prior Publication Data
US 2021/0217387 A1    Jul. 15, 2021

(30) Foreign Application Priority Data

May 29, 2018  (KR) .................. 10-2018-0061002

(51) Int. Cl.
*G09G 5/391* (2006.01)
*G09G 3/3225* (2016.01)
*G06N 20/00* (2019.01)

(52) U.S. Cl.
CPC ............ *G09G 5/391* (2013.01); *G09G 3/3225* (2013.01); *G06N 20/00* (2019.01); *G09G 2340/045* (2013.01); *G09G 2340/0407* (2013.01)

(58) Field of Classification Search
CPC .............. G09G 5/391; G09G 3/3225; G09G 2340/0407; G09G 2340/045; G06T 3/40; G06N 20/00
See application file for complete search history.

(56) References Cited

U.S. PATENT DOCUMENTS 7,676,105 B2 * 3/2010 Eruhimov .............. H04N 19/98
382/243
2017/0287109 A1 * 10/2017 Tasfi ..................... G06T 3/4046

* cited by examiner

*Primary Examiner* — Michelle L Sams
(74) *Attorney, Agent, or Firm* — Fish & Richardson P.C.

(57) ABSTRACT

Provided are a signal processing device and an image display apparatus including the same. The signal processing device and the image display apparatus including the same include a scaler configured to scale input images of various resolutions to a first resolution and a resolution enhancement processor configured to perform learning on the input images having the first resolution and to generate a first image having a second resolution higher than the first resolution. Accordingly, resolution may be stably improved even if input images of various resolutions are input.

20 Claims, 25 Drawing Sheets

SIGNAL PROCESSING DEVICE AND IMAGE DISPLAY APPARATUS INCLUDING THE SAME

CROSS-REFERENCE TO RELATED APPLICATIONS

This application is a National Stage application under 35 U.S.C. § 371 of International Application No. PCT/KR2019/006434, filed on May 29, 2019, which claims the benefit of Korean Patent Application No. 10-2018-0061002, filed on May 29, 2018. The disclosures of the prior applications are incorporated by reference in their entirety.

BACKGROUND

1. Field

The present disclosure relates to a signal processing device and an image display apparatus including the same, and more particularly, a signal processing device capable of stably improving resolution even when input images of various resolutions are input, and an image display apparatus including the same.

2. Related Art

The signal processing device is a device that performs signal processing on an input image so that an image may be displayed.

For example, the signal processing device may receive images of various resolutions through an external device or an external server and may perform signal processing thereon.

Meanwhile, in recent years, as the resolution of the image display apparatus is improved, there is an increasing need to increase the resolution of input images to improve image quality if resolution of the input images is lower than that of the image display apparatus.

Meanwhile, if there is resolution information for an input image, image quality may be improved by scaling the input image using the resolution information, but if there is no resolution information for the input image, it is difficult to process signals thereof.

SUMMARY

An object of the present disclosure is to provide a signal processing device capable of stably improving resolution even when input images of various resolutions are input, and an image display apparatus including the same.

Another object of the present disclosure is to provide a signal processing device capable of stably improving resolution even when input images of various resolutions are input but there is no resolution information of the input images, and an image display apparatus including the same.

Another object of the present disclosure is to provide a signal processing device capable of stably improving resolution using a deep neural network, and an image display apparatus including the same.

In an aspect, a signal processing device and an image display apparatus including the same include: a scaler configured to scale input images of various resolutions to a first resolution; and a resolution enhancement processor configured to perform learning on the input images having the first resolution and to generate a first image having a second resolution higher than the first resolution.

The resolution enhancement processor may be configured to output a third image having the second resolution based on an input second image having the second resolution and the first image corresponding to a residual image of the second resolution.

The signal processing device and the image display apparatus including the same may further include: a second scaler configured to scale the input images of various resolutions into the second resolution, wherein a second image having the second resolution output from the second scaler may be input to the resolution enhancement processor.

The signal processing device and the image display apparatus including the same may further include: an image quality processor configured to scale the input images of various resolutions into the second resolution, wherein a second image having the second resolution output from the image quality processor may be input to the resolution enhancement processor.

The signal processing device and the image display apparatus including the same may further include: a second resolution enhancement processor configured to perform learning on an image having the second resolution among the input images of various resolutions and to generate a fourth image having the second resolution.

The resolution enhancement processor may include: a learning inference processor configured to perform learning inference based on the input image having the first resolution and a super resolution learning model; and a calculator configured to calculate a difference between a resultant image according to the learning inference processor and a second image having the second resolution to output a third image having the second resolution.

The resolution enhancement processor may be configured to perform learning inference based on the input image having the first resolution and a super resolution learning model and to output a third image having the second resolution based on a difference between a resultant image according to the learning inference processor and a second image having the second resolution.

The resolution enhancement processor may include: a learning inference processor configured to perform learning inference based on the input image having the first resolution and a super resolution learning model; a calculator configured to calculate a difference value between a resultant image according to the learning inference processor and a second image having the second resolution; and a learning updating processor configured to perform learning for weight updating based on a node value from the learning inference processor and the difference value.

The learning inference processor may update a learning model based on a parameter value from the learning updating processor.

The resolution enhancement processor may be configured to perform leaning inference based on the input image having the first resolution and a super resolution learning model, to calculate a difference value between a resultant image according to the learning inference processor and the second image having the second resolution, to perform learning for weight updating based on a node value from the learning inference processor and the difference value, and to update a learning model based on a parameter value output according to a result of weight updating.

The signal processing device and the image display apparatus including the same may further include: a resolution detector configured to detect a resolution of the input image, wherein when the resolution of the input image detected by the resolution detector is the second resolution, the second image having the second resolution may be input to the resolution enhancement processor.

When the resolution of the input image detected by the resolution detector is the second resolution, the resolution enhancement processor may update a weight in a learning model based on the input image having the first resolution and the second image having the second resolution.

The signal processing device and the image display apparatus including the same may further include: a first weight memory configured to store a first weight; and a second weight memory configured to store a second weight, wherein the resolution enhancement processor may be configured to perform learning using the second weight from the first weight memory and to perform control to store the updated weight in the second weight memory.

The signal processing device and the image display apparatus including the same may further include: a resolution detector configured to detect a resolution of the input image, wherein when the resolution of the input image detected by the resolution detector is not the second resolution, the resolution enhancement processor may be configured to receive the input image having the first resolution scaled by the scaler and the second image having the second resolution, to perform learning on the input image having the first resolution, and to output a third image having the second resolution.

The signal processing device and the image display apparatus including the same may further include: a resolution detector configured to detect a resolution of the input image; and a second scaler configured to scale the input image to the second resolution when the resolution of the input image detected by the resolution detector is not the second resolution, wherein a second image having the second resolution output from the second scaler may be input to the resolution enhancement processor.

The signal processing device and the image display apparatus including the same may further include: an image quality processor configured to perform image quality processing on the third image output from the resolution enhancement processor.

The resolution enhancement processor may generate a first image having the second resolution higher than the first resolution using a deep neural network.

The second resolution may be varied according to a setting.

In another aspect, a signal processing device and an image display apparatus including the same include: a first resolution enhancement processor configured to perform learning on an input image having a first resolution and to generate a first image having a second resolution higher than the first resolution; a second resolution enhancement processor configured to perform learning on an input image having a third resolution and to generate a second image having the second resolution higher than the third resolution; and a third resolution enhancement processor configured to perform learning on an input image having the second resolution and to generate a third image having the second resolution.

The signal processing device and the image display apparatus including the same may further include: a fourth resolution enhancement processor configured to perform learning on an input image having a fourth resolution and to generate a fourth image having the second resolution higher than the fourth resolution.

The signal processing device and the image display apparatus including the same may further include: a scaler configured to perform scaling on an input image to output an input image having the first resolution.

ADVANTAGEOUS EFFECTS

The signal processing device and the image display apparatus including the same according to an embodiment of the present disclosure include: a scaler configured to scale input images of various resolutions to a first resolution; and a resolution enhancement processor configured to perform learning on the input images having the first resolution and to generate a first image having a second resolution higher than the first resolution. Accordingly, resolution may be stably improved even when input images of various resolutions are input. In particular, resolution may be stably improved even when input images of various resolutions are input but there is no resolution information of the input images.

Meanwhile, the resolution enhancement processor according to an embodiment of the present disclosure may be configured to output a third image having the second resolution based on an input second image having the second resolution and the first image corresponding to a residual image of the second resolution. Accordingly, resolution may be stably improved even when input images of various resolutions are input.

Meanwhile, the signal processing device and the image display apparatus including the same according to an embodiment of the present disclosure may further include: a second scaler configured to scale the input images of various resolutions into the second resolution, wherein a second image having the second resolution output from the second scaler may be input to the resolution enhancement processor. Accordingly, resolution may be stably improved even when input images of various resolutions are input.

Meanwhile, the signal processing device and the image display apparatus including the same according to an embodiment of the present disclosure may further include: an image quality processor configured to scale the input images of various resolutions into the second resolution, wherein a second image having the second resolution output from the image quality processor may be input to the resolution enhancement processor. Accordingly, resolution may be stably improved even when input images of various resolutions are input.

Meanwhile, the signal processing device and the image display apparatus including the same according to an embodiment of the present disclosure may further include: a second resolution enhancement processor configured to perform learning on an image having the second resolution among the input images of various resolutions and to generate a fourth image having the second resolution. Accordingly, resolution may be stably improved even when input images of various resolutions are input.

Meanwhile, the resolution enhancement processor according to an embodiment of the present disclosure may include: a learning inference processor configured to perform learning inference based on the input image having the first resolution and a super resolution learning model; and a calculator configured to calculate a difference between a resultant image according to the learning inference processor and a second image having the second resolution to output a third image having the second resolution. Accordingly, resolution may be stably improved even when input images of various resolutions are input.

Meanwhile, the resolution enhancement processor according to an embodiment of the present disclosure may be configured to perform learning inference based on the input image having the first resolution and a super resolution learning model and to output a third image having the second resolution based on a difference between a resultant image according to the learning inference processor and a second image having the second resolution. Accordingly, resolution may be stably improved even when input images of various resolutions are input.

Meanwhile, the resolution enhancement processor according to an embodiment of the present disclosure may include: a learning inference processor configured to perform learning inference based on the input image having the first resolution and a super resolution learning model; a calculator configured to calculate a difference value between a resultant image according to the learning inference processor and a second image having the second resolution; and a learning updating processor configured to perform learning for weight updating based on a node value from the learning inference processor and the difference value. Accordingly, resolution may be stably improved even when input images of various resolutions are input.

Meanwhile, the learning inference processor according to an embodiment of the present disclosure may update a learning model based on a parameter value from the learning updating processor.

Meanwhile, the resolution enhancement processor according to an embodiment of the present disclosure may be configured to perform leaning inference based on the input image having the first resolution and a super resolution learning model, to calculate a difference value between a resultant image according to the learning inference processor and the second image having the second resolution, to perform learning for weight updating based on a node value from the learning inference processor and the difference value, and to update a learning model based on a parameter value output according to a result of weight updating. Accordingly, resolution may be stably improved even when input images of various resolutions are input.

Meanwhile, the signal processing device and the image display apparatus including the same according to an embodiment of the present disclosure may further include: a resolution detector configured to detect a resolution of the input image, wherein when the resolution of the input image detected by the resolution detector is the second resolution, the second image having the second resolution may be input to the resolution enhancement processor. Accordingly, resolution may be stably improved even when input images of various resolutions are input.

Meanwhile, when the resolution of the input image detected by the resolution detector is the second resolution, the resolution enhancement processor according to an embodiment of the present disclosure may update a weight in a learning model based on the input image having the first resolution and the second image having the second resolution. Accordingly, resolution may be stably improved even when input images of various resolutions are input.

Meanwhile, the signal processing device and the image display apparatus including the same according to an embodiment of the present disclosure may further include: a first weight memory configured to store a first weight; and a second weight memory configured to store a second weight, wherein the resolution enhancement processor may be configured to perform learning using the second weight from the first weight memory and to perform control to store the updated weight in the second weight memory. Accordingly, resolution may be stably improved even when input images of various resolutions are input.

Meanwhile, the signal processing device and the image display apparatus including the same according to an embodiment of the present disclosure may further include: a resolution detector configured to detect a resolution of the input image, wherein when the resolution of the input image detected by the resolution detector is not the second resolution, the resolution enhancement processor may be configured to receive the input image having the first resolution scaled by the scaler and the second image having the second resolution, to perform learning on the input image having the first resolution, and to output a third image having the second resolution. Accordingly, resolution may be stably improved even when input images of various resolutions are input.

Meanwhile, the signal processing device and the image display apparatus including the same according to an embodiment of the present disclosure may further include: a resolution detector configured to detect a resolution of the input image; and a second scaler configured to scale the input image to the second resolution when the resolution of the input image detected by the resolution detector is not the second resolution, wherein a second image having the second resolution output from the second scaler may be input to the resolution enhancement processor.

Meanwhile, the signal processing device and the image display apparatus including the same according to an embodiment of the present disclosure may further include: an image quality processor configured to perform image quality processing on the third image output from the resolution enhancement processor. Accordingly, resolution may be stably improved even when input images of various resolutions are input.

The resolution enhancement processor according to an embodiment of the present disclosure may generate a first image having the second resolution higher than the first resolution using a deep neural network (DNN). Accordingly, resolution may be stably improved using the DNN.

The second resolution may be varied according to a setting. Accordingly, resolution may be stably improved even when input images of various resolutions are input.

In another aspect, the signal processing device and the image display apparatus including the same according to an embodiment of the present disclosure include: a first resolution enhancement processor configured to perform learning on an input image having a first resolution and to generate a first image having a second resolution higher than the first resolution; a second resolution enhancement processor configured to perform learning on an input image having a third resolution and to generate a second image having the second resolution higher than the third resolution; and a third resolution enhancement processor configured to perform learning on an input image having the second resolution and to generate a third image having the second resolution. Accordingly, resolution may be stably improved even when input images of various resolutions are input. In particular, resolution may be stably improved even when input images of various resolutions are input but there is no resolution information of the input images.

The signal processing device and the image display apparatus including the same according to an embodiment of the present disclosure may further include: a fourth resolution enhancement processor configured to perform learning on an input image having a fourth resolution and to generate a fourth image having the second resolution higher than the fourth resolution. Accordingly, resolution may be stably improved even when input images of various resolutions are input.

The signal processing device and the image display apparatus including the same according to an embodiment of the present disclosure may further include: a scaler configured to perform scaling on an input image to output an input image having the first resolution. Accordingly, resolution may be stably improved even when input images of various resolutions are input.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF EMBODIMENTS

Hereinafter, the present disclosure will be described in more detail with reference to the drawings.

The suffixes "module" and "unit" for the constituent elements used in the following description are given in consideration of only the ease of preparation of the present disclosure and do not impart a particularly important meaning or role by themselves. Accordingly, the "module" and "unit" may be used interchangeably with each other.

Figure 1:
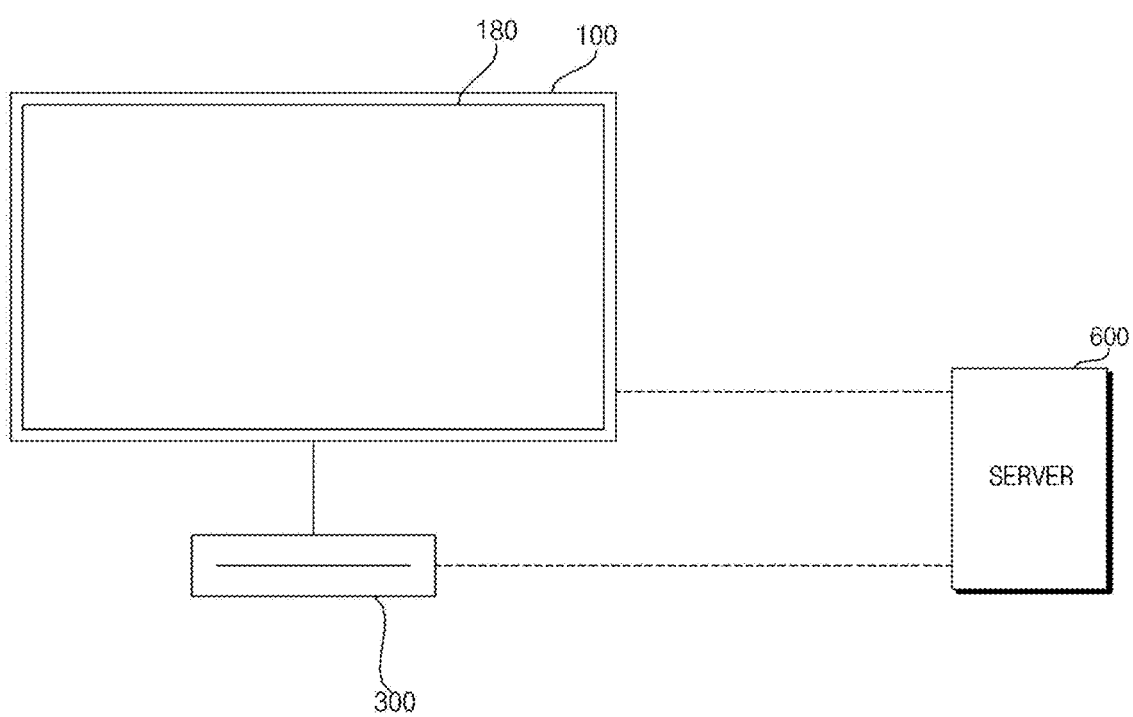
FIG. 1 illustrates an image display system according to an embodiment of the present disclosure.

FIG. 1 illustrates an image display system according to an embodiment of the present disclosure.

Referring to FIG. 1, an image display system 10 according to an embodiment of the present disclosure may include an image display apparatus 100 having a display 180, a set-top box 300, and a server 600.

The image display apparatus 100 according to an embodiment of the present disclosure may receive an image from the set-top box 300 or the server 600.

For example, the image display apparatus 100 may receive an image signal from the set-top box 300 through an HDMI terminal.

As another example, the image display apparatus 100 may receive an image signal from the server 600 through a network terminal.

Meanwhile, the image display apparatus 100 may receive input images of various resolutions through an external set-top box 300 or a network.

Meanwhile, the image display apparatus 100 according to an embodiment of the present disclosure may scale an input image of various resolutions to a first resolution and perform learning on the input images having the first resolution to generate a first image having a second resolution higher than the first resolution.

In particular, the image display apparatus 100 may output a third image having the second resolution based on an input second image having the second resolution and the first image corresponding to a residual image of the second resolution. Accordingly, even when input images of various resolutions are input, the resolution may be stably improved. In particular, resolution may be stably improved even when input images of various resolutions are input but there is no resolution information of the input image. Further, image quality may be improved.

Meanwhile, the image display apparatus 100 according to an embodiment of the present disclosure may generate the first image having the second resolution higher than the first resolution using a deep neural network (DNN). Accordingly, the resolution may be stably improved using the DNN.

Meanwhile, the image display apparatus 100 may update a parameter for the DNN and calculate a resolution and a noise level of the input image based on the updated parameter. Accordingly, it is possible to accurately calculate original quality of an image signal based on learning.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel).

In the present invention, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that the signal processor 170 (see FIG. 2) of the image display apparatus 100 performs image quality processing for the OLED panel. Meanwhile, the signal processor may be called a signal processing device. Hereinafter, the signal processing device and the signal processor are used to have the same meaning.

Meanwhile, the image display apparatus 100 in FIG. 1 may be a TV, a monitor, a tablet PC, a mobile terminal, a display for a vehicle, etc.

Figure 2:
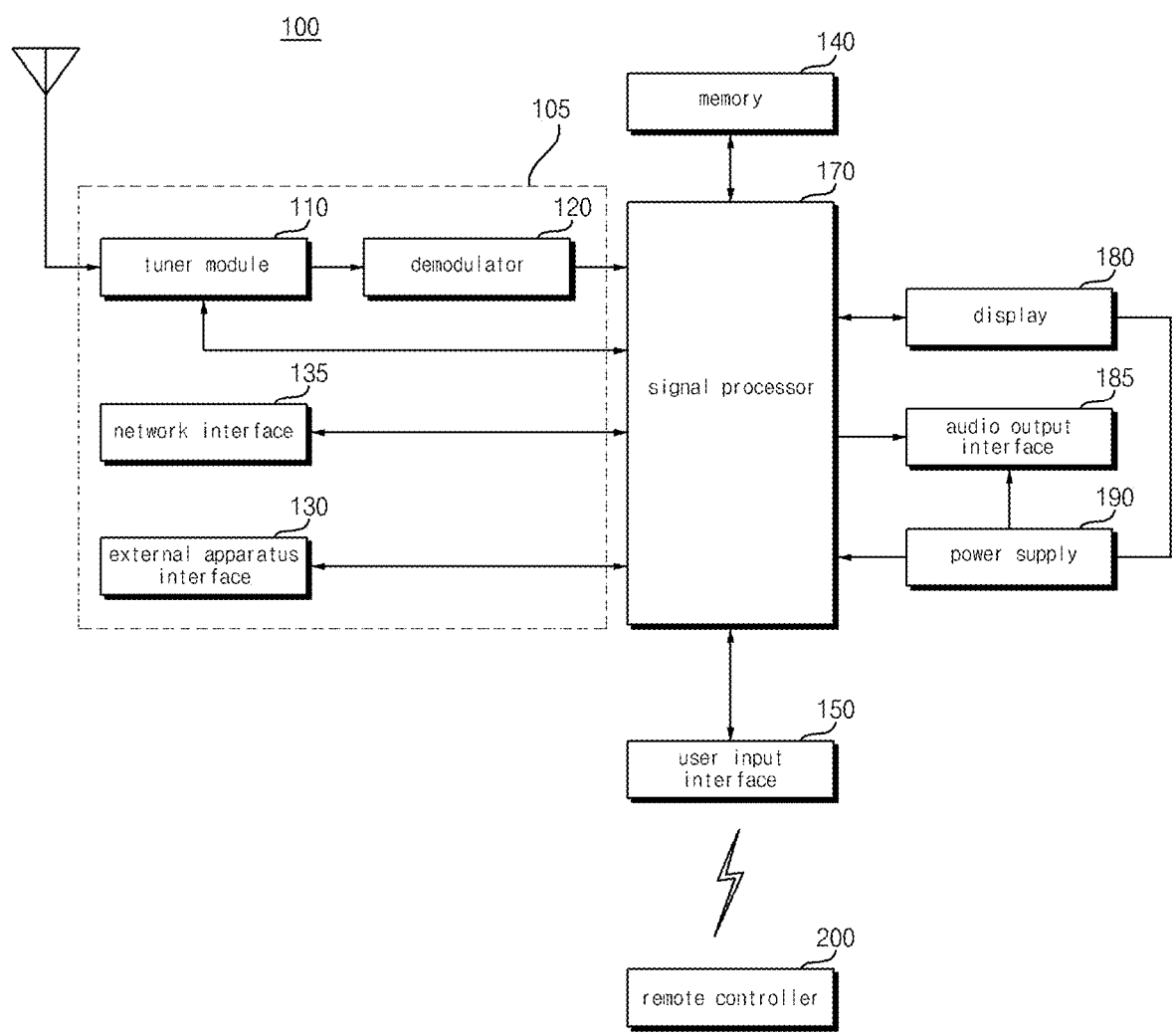
FIG. 2 is an example of an internal block diagram of an image display apparatus of FIG. 1.

FIG. 2 is an example of an internal block diagram of the image display apparatus of FIG. 1.

Referring to FIG. 2, the image display apparatus 100 according to an embodiment of the present invention includes a broadcast receiver 105, a memory 140, a user input interface 150, a sensor module (not shown), a signal processor 170, a display 180, and an audio output interface 185.

The signal processor 170 in the drawing may correspond to the signal processing device described above.

The broadcast receiver 105 may include a tuner module 110, a demodulator 120, a network interface 135, and an external apparatus interface 130.

Meanwhile, unlike the drawing, the broadcast receiver 105 may include only the tuner module 110, the demodulator 120, and the external apparatus interface 130. That is, the network interface 135 may not be included.

The tuner module 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner module 110 can process a digital broadcast signal or an analog broadcast signal. The analog baseband image or audio signal (CVBS/SIF) output from the tuner module 110 may be directly input to the signal processor 170.

Meanwhile, the tuner module 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner module 110 and performs a demodulation operation.

The demodulator 120 may perform demodulation and channel decoding and then output a stream signal TS. Here, the stream signal may be a multiplexed signal of an image signal, a audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output interface 185.

The external apparatus interface 130 may transmit or receive data with a connected external apparatus (not shown), e.g., a set-top box 50. To this end, the external apparatus interface 130 may include an A/V input and output interface (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output interface may receive image and audio signals from an external apparatus. Meanwhile, a wireless communicator (not shown) may perform short-range wireless communication with other electronic apparatus.

Through the wireless communicator (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the signal processor 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present invention is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor module (not shown) that senses a user's gesture to the signal processor 170, or may transmit a signal from the signal processor 170 to the sensor module (not shown).

The signal processor 170 may demultiplex the input stream through the tuner module 110, the demodulator 120, the network interface 135, or the external apparatus interface 130, or process the demultiplexed signals to generate and output a signal for image or audio output.

For example, the signal processor 170 may receive a broadcast signal or HDMI signal received by the broadcast receiver 105, and perform signal processing based on the received broadcast signal or HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output interface 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 is capable of performing a variety of signal processing, and, for this reason, the signal processor 170 may be implemented in the form of System On Chip (SOC). This will be described later with reference to FIG. 3.

In addition, the signal processor 170 can control the overall operation of the image display apparatus 100. For example, the signal processor 170 may control the tuner module 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. Here, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processor 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170 or an input image, a data signal, a control signal, and the like in the external device interface 130.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output interface 185 receives a signal processed by the signal processor 170 and outputs it as an audio.

The photographing device (not shown) photographs a user. The photographing device (not shown) may be implemented by a single camera, but the present invention is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor module (not shown), or a combination thereof.

The power supply 190 supplies corresponding power to the image display apparatus 100. Particularly, the power supply 190 may supply the power to the signal processor 170 which can be implemented in the form of SOC, the display 180 for displaying an image, and an audio output interface 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present invention. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

Figure 3:
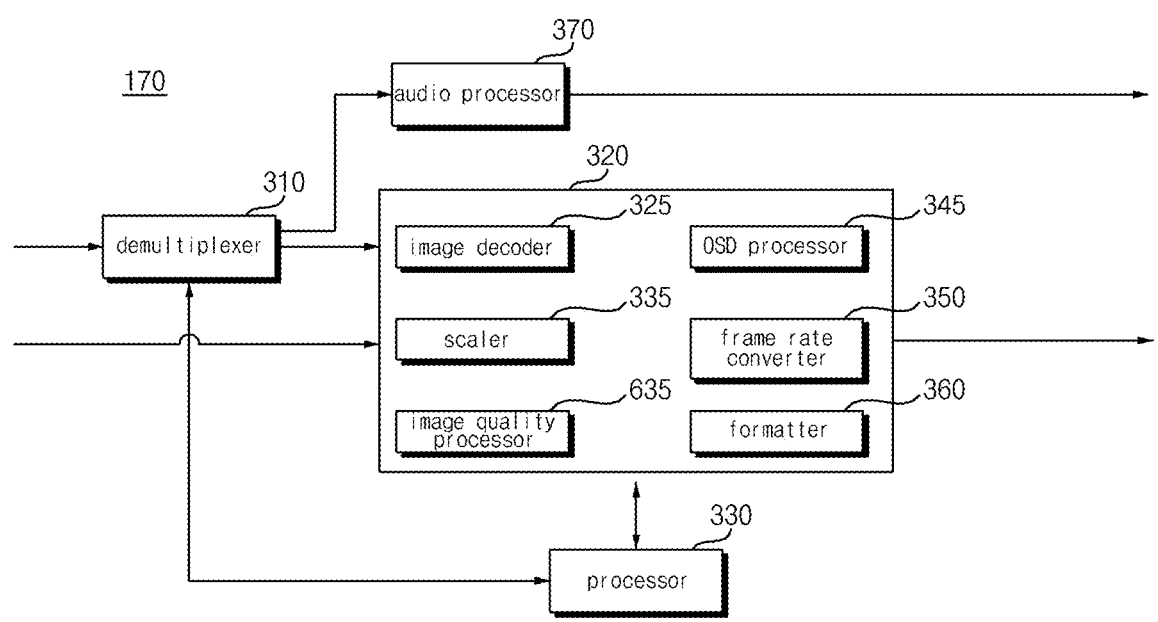
FIG. 3 is an example of an internal block diagram of a signal processor of FIG. 2.

FIG. 3 is an example of an internal block diagram of a signal processor shown in FIG. 2.

Referring to the drawing, the signal processor 170 according to an embodiment of the present invention may include a demultiplexer 310, an image processor 320, a processor 330, and an audio processor 370. In addition, it may further include a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner module 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of gray level of the input image signal, perform image resolution enhancement, perform high dynamic range (HDR)-based signal processing, change a frame rate, perform image quality processing appropriate for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The frame rate converter (FRC) 350 may convert the frame rate of an input image. Meanwhile, the frame rate converter 350 can also directly output the frame rate without any additional frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processor 170.

For example, the processor 330 may control the tuner module 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present invention. Each component of the block diagram may be integrated, added, or omitted according to a specification of the signal processor 170 actually implemented.

In particular, the frame rate converter 350 and the formatter 360 may be provided separately from the image processor 320.

Figure 4A:
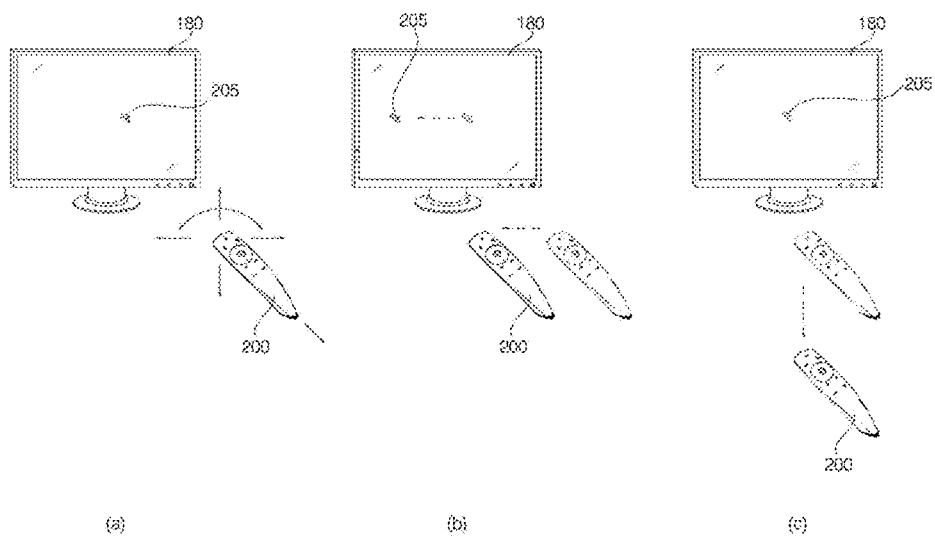
FIG. 4A illustrates a control method of a remote control device of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
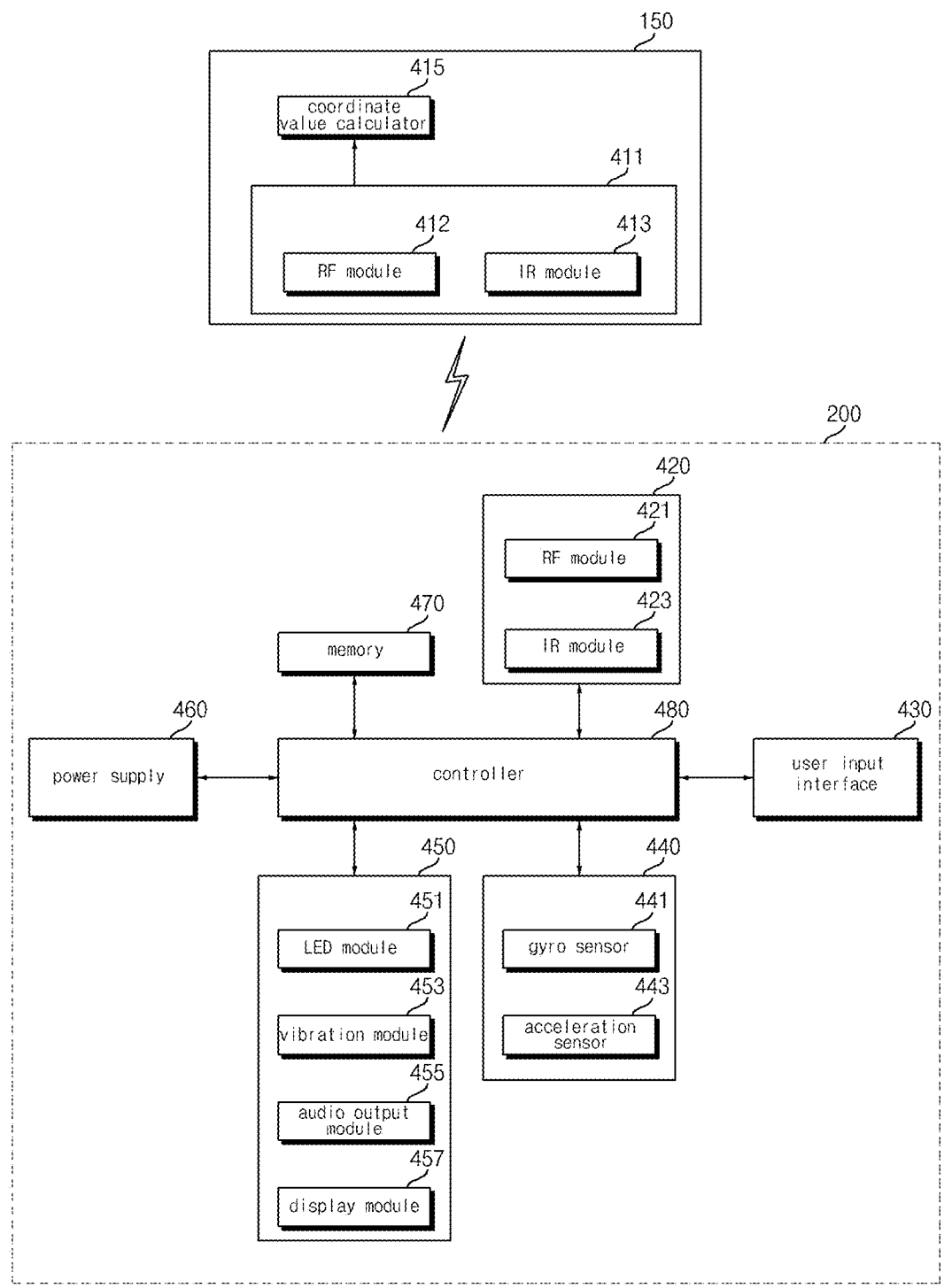
FIG. 4B is an internal block diagram of the remote control device of FIG. 2.

FIG. 4B is an internal block diagram of the remote controller of FIG. 2.

Referring to the drawing, the remote controller 200 includes a wireless communicator 425, a user input interface 430, a sensor module 440, an output interface 450, a power supply 460, a memory 470, and a controller 480.

The wireless communicator 425 transmits/receives a signal to/from any one of the image display apparatuses according to the embodiments of the present invention described above. Among the image display apparatuses according to the embodiments of the present invention, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input interface 435 may be implemented by a keypad, a button, a touch pad, a touch screen, or the like. The user may operate the user input interface 435 to input a command related to the image display apparatus 100 to the remote controller 200. When the user input interface 435 includes a hard key button, the user can input a command related to the image display apparatus 100 to the remote controller 200 through a push operation of the hard key button. When the user input interface 435 includes a touch screen, the user may touch a soft key of the touch screen to input the command related to the image display apparatus 100 to the remote controller 200. In addition, the user input interface 435 may include various types of input means such as a scroll key, a jog key, etc., which can be operated by the user, and the present invention does not limit the scope of the present invention.

The sensor module 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output interface 450 may output an image or an audio signal corresponding to the operation of the user input interface 435 or a signal transmitted from the image display apparatus 100. Through the output interface 450, the user may recognize whether the user input interface 435 is operated or whether the image display apparatus 100 is controlled.

For example, the output interface 450 may include an LED module 451 that is turned on when the user input interface 430 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input interface 430 or a signal corresponding to the motion of the remote controller 200 sensed by the sensor module 440 to the image display apparatus 100 through the wireless communicator 425.

The user input interface 150 of the image display apparatus 100 includes a wireless communicator 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communicator 151 and calculate the coordinate value (x, y) of the pointer 205 to be displayed on the display 180.

The transmission signal of the remote controller 200 inputted to the image display apparatus 100 through the user input interface 150 is transmitted to the signal processor 170 of the image display apparatus 100. The signal processor 170 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the signal processor 170 without a separate correction process of hand shake or error.

For another example, unlike the drawing, the coordinate value calculator 415 may be provided in the signal processor 170, not in the user input interface 150.

Figure 5:
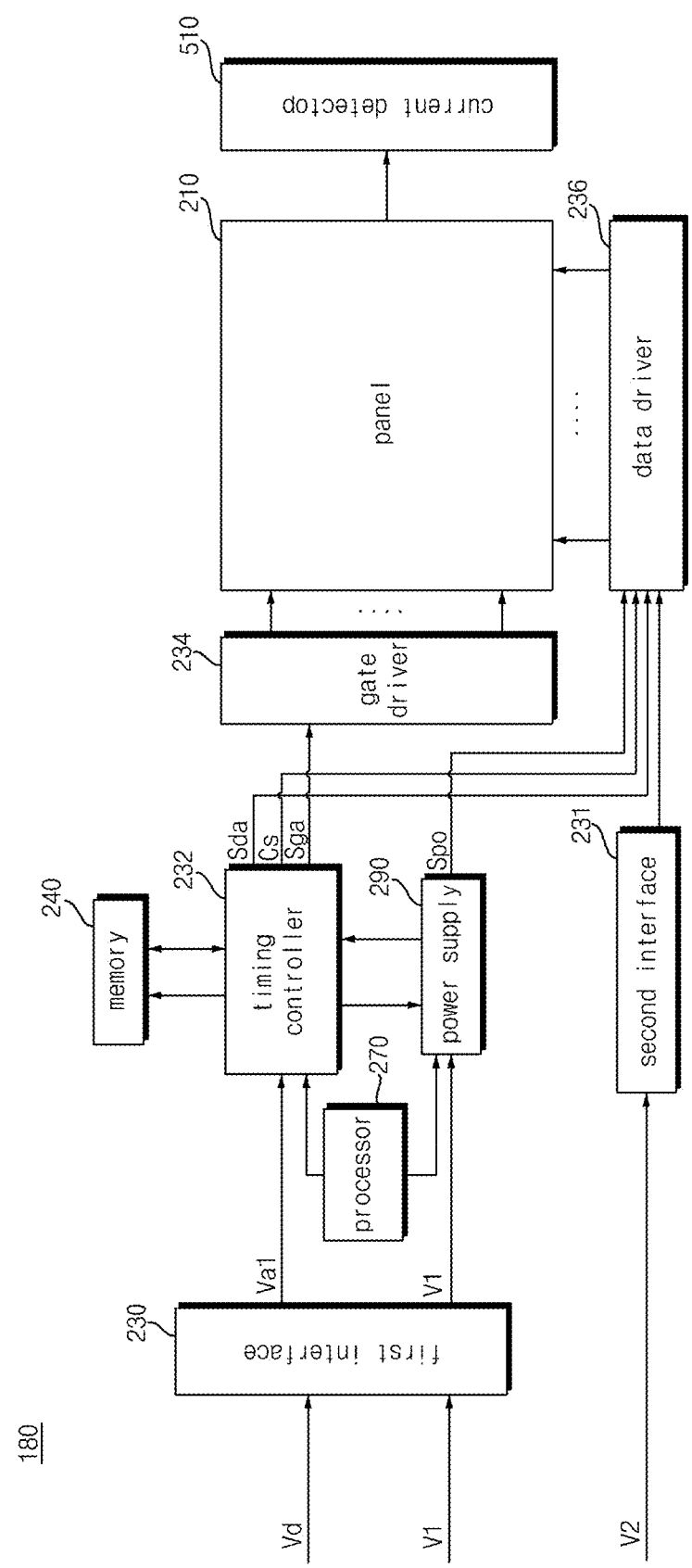
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Here, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
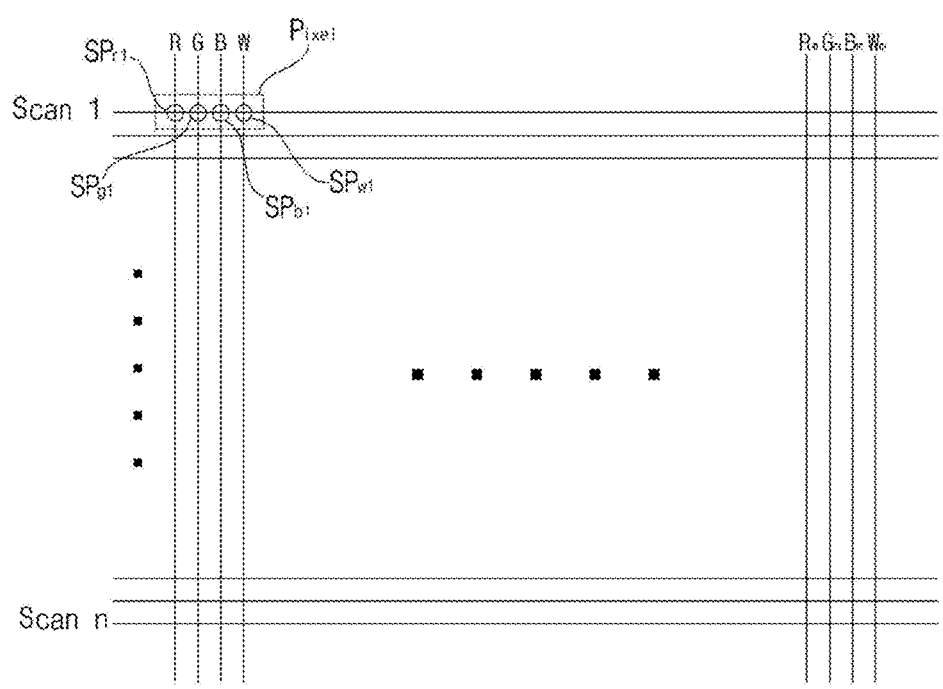
FIGS. 6A to 6B are views referenced for illustrating an organic light emitting panel of FIG. 5.
Figure 6B:
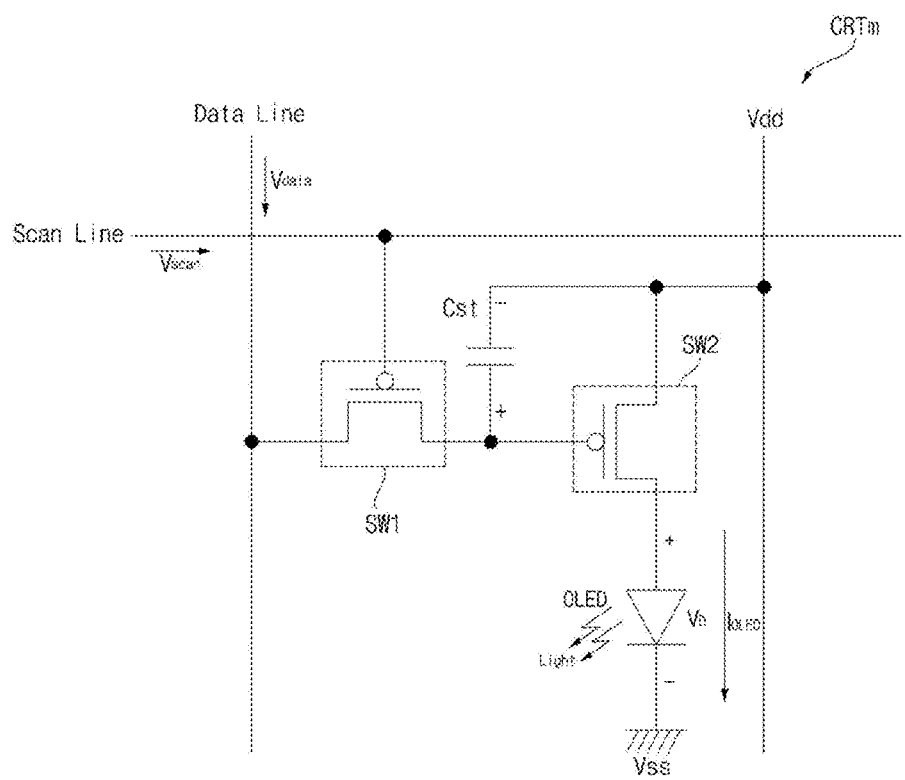

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
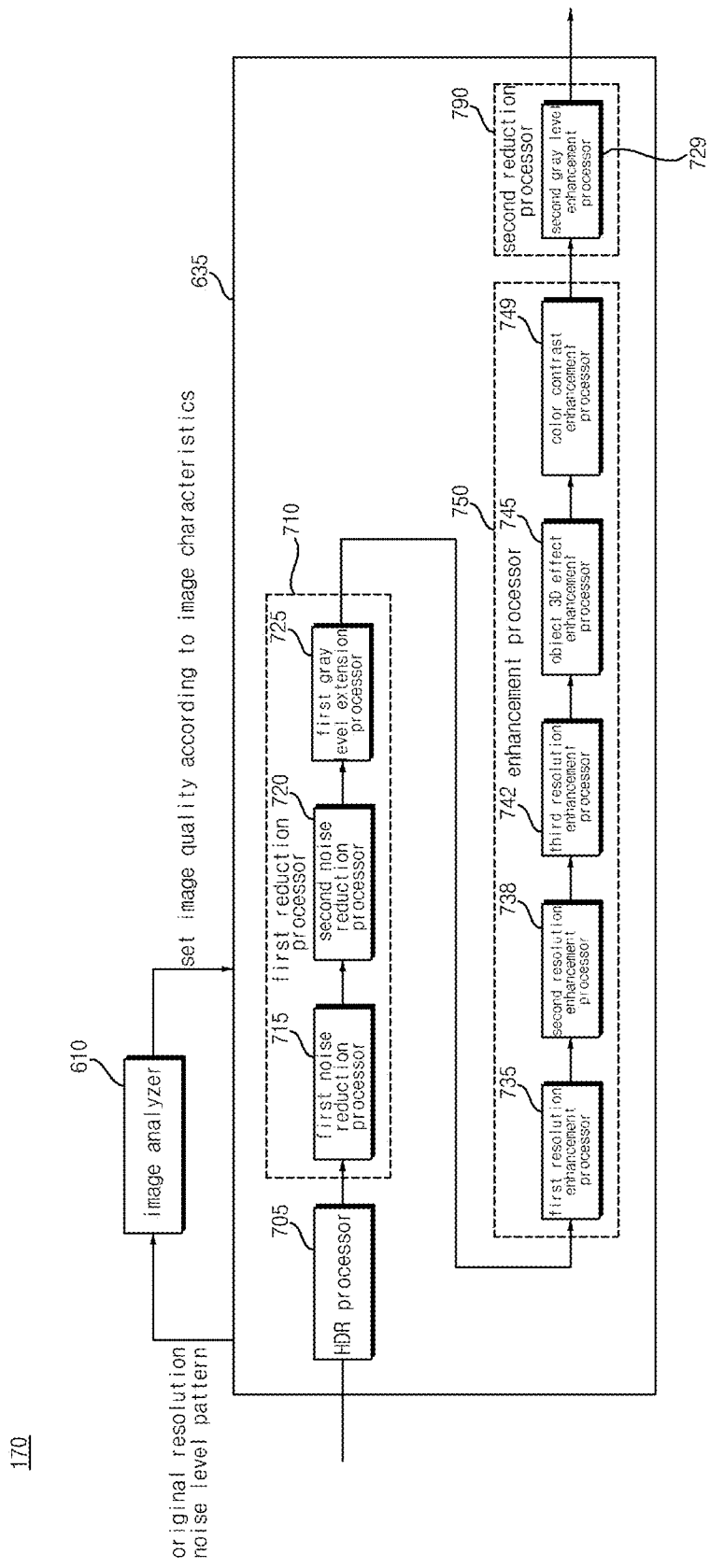
FIG. 7 illustrates an example of an internal block diagram of a signal processor of FIG. 2.
Figure 8A:
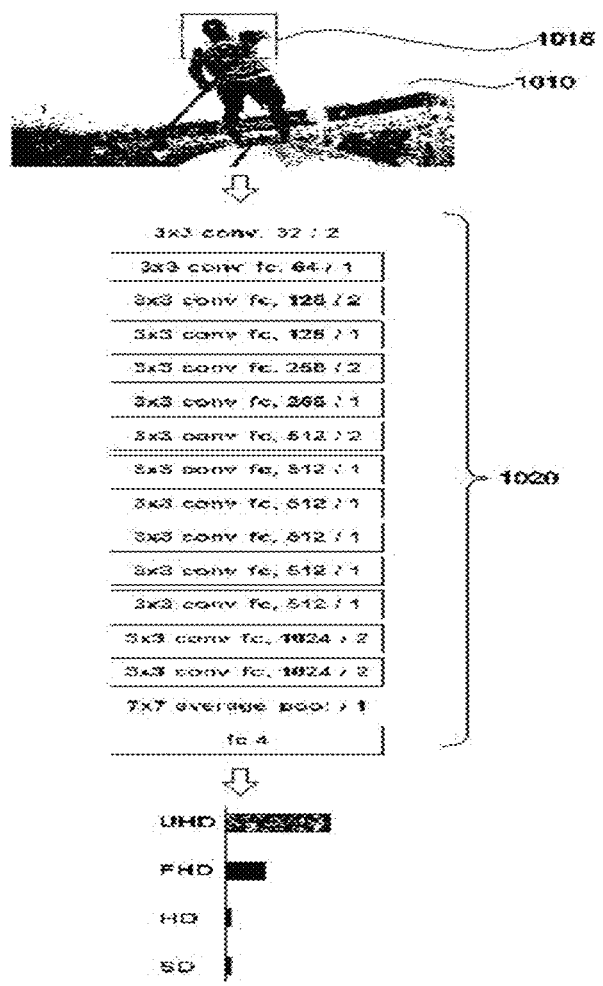
FIGS. 8A to 8B are views referenced for illustrating an operation of the signal processor of FIG. 7.
Figures 8B, 9:
FIG. 9 is a view illustrating a relationship between an original image resolution and an input image resolution.

FIG. 7 illustrates an example of an internal block diagram of the signal processor of FIG. 2, and FIGS. 8A to 8B are views referenced for explanation of the operation of the signal processor of FIG. 7.

Referring to the drawings, the signal processor 170 according to an embodiment of the present invention may include an image analyzer 610 and an image quality processor 635.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the image decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processor 635.

The image quality processor 635 may include an HDR processor 705, a first reduction processor 710, an enhancement processor 750, and a second reduction processor 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform gray level processing on the input image signal for an HDR.

Meanwhile, if an input image signal is an SDR image signal, the HDR processor 705 may bypass gray level conversion, and, if an input image signal is an HDR image signal, the HDR processor 705 performs gray level conversion. Accordingly, it is possible to improve high gray level expression for an input image.

Meanwhile, the HDR processor 705 may convert gray level according to a first gray level conversion mode, in which low gray level is to be enhanced and high gray level is to be saturated, and a second gray level conversion mode, in which low gray level and high gray level are somewhat uniformly converted.

Specifically, if the first gray level conversion mode is implemented, the HDR processor 705 may convert gray level based on data corresponding to the first gray level conversion mode in a lookup table.

More specifically, if the first gray level conversion mode is implemented, the HDR processor 705 may convert gray level based on an equation of input data and the first gray level conversion mode in a lookup table determined by the equation. Here, the input data may include video data and metadata.

Meanwhile, if the second gray level conversion mode is implemented, the HDR processor 705 may convert gray level based on data corresponding to the second gray level conversion mode in a lookup table.

More specifically, if the second gray level conversion mode is implemented, the HDR processor 705 may convert gray level based on an equation of input data and data corresponding to the second gray level conversion mode in a lookup table determined by the equation. Here, the input data may include video data and metadata.

Meanwhile, the HDR processor 705 may select the first gray level conversion mode or the second gray level conversion mode according to a third gray level conversion mode or a fourth gray level conversion mode in a high gray level amplifier 851 in the second reduction processor 790.

For example, if the third gray level conversion mode is implemented, the high gray level amplifier 851 in the second reduction processor 790 may convert gray level based on data corresponding to the third gray level conversion mode in a lookup table.

Specifically, if the third gray level conversion mode is implemented, the high gray level amplifier 851 in the second reduction processor 790 may perform convert gray level based on an equation of input data and data corresponding to the third gray level conversion mode in a lookup table determined by the equation. Here, the input data may include video data and metadata.

Meanwhile, if the fourth gray level conversion mode is implemented, the high gray level amplifier 851 in the second reduction processor 790 may convert gray level based on data corresponding to the fourth gray level conversion mode in a lookup table.

Specifically, if the fourth gray level conversion mode is implemented, the high gray level amplifier 851 in the second reduction processor 790 may perform convert gray level based on an equation of input data and data corresponding to the fourth gray level conversion mode in a lookup table determined by the equation. Here, the input data may include video data and metadata.

For example, if the fourth gray level conversion mode is implemented in the high gray level amplifier 851 in the second reduction processor 790, the HDR processor 705 may implement the second gray level conversion mode.

For another example, if the third gray level conversion mode is implemented in the high gray level amplifier 851 in the second reduction processor 790, the HDR processor 705 may implement the first gray level conversion mode.

Alternatively, the high gray level amplifier 851 in the second reduction processor 790 may change a gray level conversion mode according to a gray level conversion mode in the HDR processor 705.

For example, if the second gray level conversion mode is implemented in the HDR processor 705, the high gray level amplifier 851 in the second reduction processor 790 may perform the fourth gray level conversion mode.

For another example, if the first gray level conversion mode is implemented in the HDR processor 705, the high gray level amplifier 851 in the second reduction processor 790 may implement the third gray level conversion mode.

Meanwhile, the HDR processor 705 according to an embodiment of the present invention may implement a gray level conversion mode so that low gray level and high gray level are converted uniformly.

Meanwhile, according to the second gray level conversion mode in the HDR processor 705, the second reduction processor 790 may implement the fourth gray level conversion mode and thereby amplify an upper limit on gray level of a received input signal. Accordingly, it is possible to improve high gray level expression for the input image.

Next, the first reduction processor 710 may perform noise reduction on an input image signal or an image signal processed by the HDR processor 705.

Specifically, the first reduction processor 710 may perform multiple stages of noise reduction processing and a first stage of gray level extension processing on an input image signal or an HDR image from the HDR processor 705.

To this end, the first reduction processor 710 may include a plurality of noise reduction processors 715 and 720 for reducing noise in multiple stages, and a first gray level extension processor 725 for extending gray level.

Next, the enhancement processor 750 may perform multiple stages of image resolution enhancement processing on an image from the first reduction processor 710.

In addition, the enhancement processor 750 may perform object three-dimensional effect enhancement processing. In addition, the enhancement processor 750 may perform color or contrast enhancement processing.

To this end, the enhancement processor 750 may include: a plurality of resolution enhancement processors 735, 738, 742 for enhancing a resolution of an image in multiple stages; an object three-dimensional effect enhancement processor 745 for enhancing a three-dimensional effect of an object; and a color contrast enhancement processor 749 for enhancing color or contrast.

Next, the second reduction processor 790 may perform a second stage of gray level extension processing based on a noise-reduced image signal received from the first reduction processor 710.

Meanwhile, the second reduction processor 790 may amplify an upper limit on gray level of an input signal, and extend a resolution of high gray level of the input signal. Accordingly, it is possible to improve high gray level expression for an input image.

For example, gray level extension may be performed uniformly on the entire gray level range of an input signal. Accordingly, gray level extension is performed uniformly on the entire area of an input image, thereby improving high gray level expression.

Meanwhile, the second reduction processor 790 may perform gray level amplification and extension based on a signal received from the first gray level extension processor 725. Accordingly, it is possible to improve high gray level expression for an input image.

Meanwhile, if an input image signal input is an SDR image signal, the second reduction processor 790 may vary the degree of amplification based on a user input signal. Accordingly, it is possible to improve high gray level expression in response to a user setting.

Meanwhile, if an input image signal is an HDR image signal, the second reduction processor 790 may perform amplification according to a set value. Accordingly, it is possible to improve high gray level expression for an input image.

Meanwhile, if an input image signal is an HDR image signal, the second reduction processor 790 may vary the degree of amplification based on a user input signal. Accordingly, it is possible to improve high gray level expression according to a user setting.

Meanwhile, in the case of extending gray level based on a user input signal, the second reduction processor 790 may vary the degree of extension of gray level. Accordingly, it is possible to improve high gray level expression according to a user's setting.

Meanwhile, the second reduction processor 790 may amplify an upper limit on gray level according to a gray level conversion mode in the HDR processor 705. Accordingly, it is possible to improve high gray level expression for an input image.

The signal processor 170 includes the HDR processor 705 configured to receive an image signal and adjust luminance of the input image signal, and the reduction processor 790 configured to amplify brightness of the image signal received from the HDR processor 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the signal processor 170.

Meanwhile, the signal processor 170 further includes an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the signal processor 170.

Meanwhile, a control signal is received from a controller of an image display apparatus, which relates to signal processing, and the control signal corresponds to a setting of the image display apparatus.

Meanwhile, the reduction processor 790 may include the high gray level amplifier 851 configured to amplify an upper limit on gray level of an input signal, and a decontouring processor 842 and 844 configured to extend the resolution of gray level amplified by the high gray level amplifier 851.

The second reduction processor 790 may include a second gray level extension processor 729 for a second stage of gray level extension.

Meanwhile, the image quality processor 635 in the signal processor 170 according to the present invention is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reduction processors 715 and 720 in the first reduction processor 710, and the two stages of gray level extension processing may be performed by the first gray level extension processor 725 in the first reduction processor 710 and the second gray level extension processor 729 in the second reduction processor 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancement processors 735, 738, and 742, and the object three-dimensional effect enhancement may be performed by the object three-dimensional enhancement processor 745.

Meanwhile, the signal processor 170 of the present invention may apply the same algorithm or similar algorithms to image quality processing multiple times, thereby enabled to gradually enhance an image quality.

To this end, the image quality processor 635 of the signal processor 170 of the present invention may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in multiple stages, there is an advantageous effect to cause a less number of artifacts to appear in an image, resulting in a more natural and more vivid image processing result.

Meanwhile, the same algorithm or the similar algorithms are applied multiple times alternately with a different image quality algorithm, thereby bringing an effect more than simple continuous processing.

Meanwhile, the signal processor 170 of the present invention may perform noise reduction processing in multiple stages. Each stage of noise reduction processing may include temporal processing and spatial processing.

Meanwhile, in order to calculate original quality of an image signal, the present invention uses the state-of-the-art technology such as artificial intelligence (AI). To this end, a Deep Neural Network (DNN) may be used.

The quality calculator 632 may calculate a resolution and a noise level of an input image signal using the DNN.

The quality calculator 632 may obtain an original resolution and a training image for each compression rate, and train the network so as to increase accuracy of the calculation.

A variety of images which can be commonly seen in ordinary broadcasting programs are provided as images used for the training, and thus, it is possible to cover any input environment.

Meanwhile, in order to reduce detection time or cost, the quality calculator 632 may perform learning using Convolutional Neural Network, Mobile-Net, and the like which has few number of layers.

For example, the quality calculator 632 may analyze only a region (e.g., 224×224, 128×128, 64×64, etc.) of an entire image.

Meanwhile, the quality calculator 632 may select a detection region appropriate for a purpose of detection.

For example, the quality calculator 632 may select a first region having the greatest number of edge components when detecting an original resolution, and select a second region having the least number of edge components when detecting noise.

In particular, the quality calculator 632 may apply an algorithm that selects a detection region in a short time in order to increase a processing speed.

For example, the quality calculator 632 may perform pre-processing such as Fast Fourier Transform (FFT) on a detection region.

FIG. 8A is a diagram showing calculation based on a Convolutional Neural Network (CNN).

Referring to the drawing, a convolutional neural network is used for a particular region 1015 in an acquired image 1010.

As the convolution neural network, a convolution network and a deconvolution network may be implemented.

According to the convolution neural network, convolution and pooling are performed repeatedly.

Meanwhile, according to the CNN scheme shown in FIG. 9A, information on the region 1015 may be used to determine types of pixels in the region 1015.

FIG. 8B is a diagram showing calculation based on Mobile-Net.

According to the scheme shown in the drawing, quality calculation is performed.

Meanwhile, as original quality changes, the signal processor 170 of the present invention may apply an image quality setting corresponding to the changed quality in real time.

In particular, the signal processor 170 may perform control apply, when the image quality setting is changed, the change of the image quality setting without any condition such as a channel change or an input change while an image is reproduced.

In this case, "real time" refers to employing a temporal processing technique including imaging infrared (IIR) and step movement.

Meanwhile, an input image input to the image display apparatus 100 may be input as a fixed image size set in the external device 400 or may be input as a compressed image size through an internal image decoder.

Accordingly, the signal processor 170 in the image display apparatus 100 may expand an image size with at least one scaler for image size expansion, image quality processing, etc., and performs image quality processing to improve sharpness.

Here, only an input image having a specific size was subjected to image size expansion and image quality processing.

In addition, image quality processing is based on low-level feature such as variance indicating a distribution of a difference between a median value of an edge or a pixel and a peripheral value, having a limitation that is not adaptive to the image resolution.

In addition, image quality processing was performed with only the input image resolution regardless of a source resolution of the input image, and there is a limitation in that an improvement filter and a size adjustment filter cannot be applied correspondingly to the original resolution of the input image.

Meanwhile, research into a super resolution (SR) algorithm has been conducted regarding the number of frames in use, in which of data region of a spatial region feature matching with a frequency is to be performed, whether high-resolution images are to be inferred from input low-resolution or whether to use a data set having a previously created codebook concept.

The SR algorithm includes two key steps in common. The first is how to create or from which candidate data to be used as an image patch that represents high resolution and the second is extracting features to be used to compare and determine interrelationship between the input low-resolution image and the data defined in the first step.

The features used here are diverse such as edge and periphery values, brightness of corresponding pixels, color difference or histogram, and pattern direction, but low- or mid-level features are generally used in image processing fields.

However, real images are very diverse in many ways for human analysis, and there is a limit for human to directly develop improved filters for generating features and high-resolution candidate patches, and thus improvement of performance of the SR has stagnated after reaching a certain level.

Meanwhile, deep learning, which is mainly used in the image field, has a form in which several layers are sequentially connected, and an output of each layer is used as an input of the next layer. Also, all layers calculates the entirety or part of input data as a weighted sum and obtains a resultant output by applying a non-linear function to the calculated value. Also, in the learning process, a weight of the synapse connecting inputs and outputs of all layers is obtained.

Such a deep learning structure has several similarities when compared to the SR algorithm.

First, a feature extraction filter and an image quality improvement filter used in the SR algorithm will play a similar role to the synapse weight in the deep learning structure, and secondly, whether to reflect multiple filter results of the SR in the deep learning layer or strength may be considered by matching output determination through non-linearity. In addition, compared to the existing case where images of at most 100 units are referenced in the algorithm development process, deep learning-based algorithms use more than 10,000 units of learning data, so the deep learning-based algorithm is considered to more elaborately analyze more images than human to generate an improvement filter fitting thereto.

Therefore, in the present disclosure, it is assumed that superior resolution (SR) is performed using an algorithm based on artificial intelligence technology.

Accordingly, the present disclosure proposes a method of stably improving resolution based on artificial intelligence even when input images of various resolutions are input.

In particular, the present disclosure proposes a superior resolution (SR) method to improve image quality performance in consideration of original image resolution information without directly receiving it.

In addition, the present disclosure proposes a way to continuously improve performance by self-learning the super resolution (SR) based on artificial intelligence.

FIG. 9 is a view illustrating a relationship between an original image resolution and an input image resolution.

Referring to FIG. 9, when the original image resolution is SD, the input image resolution input to the image display apparatus 100 is preferably SD, HD, FHD, and UHD.

Meanwhile, when the original image resolution is HD, the input image resolution input to the image display apparatus 100 is preferably HD, FHD, or UHD.

Meanwhile, when the original image resolution is FHD, the input image resolution input to the image display apparatus 100 is preferably FHD or UHD.

Meanwhile, when the original image resolution is UHD, the input image resolution input to the image display apparatus 100 is preferably UHD.

Meanwhile, here, the UHD resolution may include 8K resolution as well as 4K resolution.

Meanwhile, according to an embodiment of the present disclosure, detection of original resolution information and corresponding scaler and enhancer may all be implemented in an integrated network structure.

Meanwhile, according to a learning method used in a training process, the deep learning structure is divided into (1) supervised learning, which learns a correlation between an input and a target output by knowing a correct answer, (2) unsupervised learning, which is mainly used in a clustering field by analyzing a relationship between various input data, and (3) reinforcement learning, which continuously perform learning to maximize a reward after defining the reward for a certain behavior in a current state.

Recently, in the field of image processing, research is being conducted in various fields such as noise removal, frame interpolation, and segmentation using supervised learning methods. Among them, super resolution is gaining excellent research results by receiving low-resolution images as an input and targeting high-resolution images matched to the low-resolution images.

Meanwhile, most of the super resolution methods under study use the original resolution image as an input at a fixed ratio between inputs and outputs and compares and evaluates algorithm research performance, so it may be difficult to be considered as a solution for the same situation as the case of an actual image display apparatus. Accordingly, even if the deep learning structure is adopted as it is in the image display apparatus, resultantly obtained improvement of image quality may be lower than expected.

In order to solve this problem, the present disclosure proposes a method of organizing various input image resolutions and original image resolutions available in the input and learning a network using a training set including the number of all cases.

In this manner, a deep learning super resolution (SR) algorithm, which is the result of learning, proposes a solution for various problems by including adaptive filter configuration and application strength based on the resolution relationship between the input and the original image in addition to the image quality improvement and resolution improvement aimed by the super resolution (SR).

That is, the present disclosure proposes a deep learning-based super resolution (SR) application method capable of processing various resolution images as shown in the table 100 of FIG. 9, as a learning/evaluation database for a network.

Figure 11:
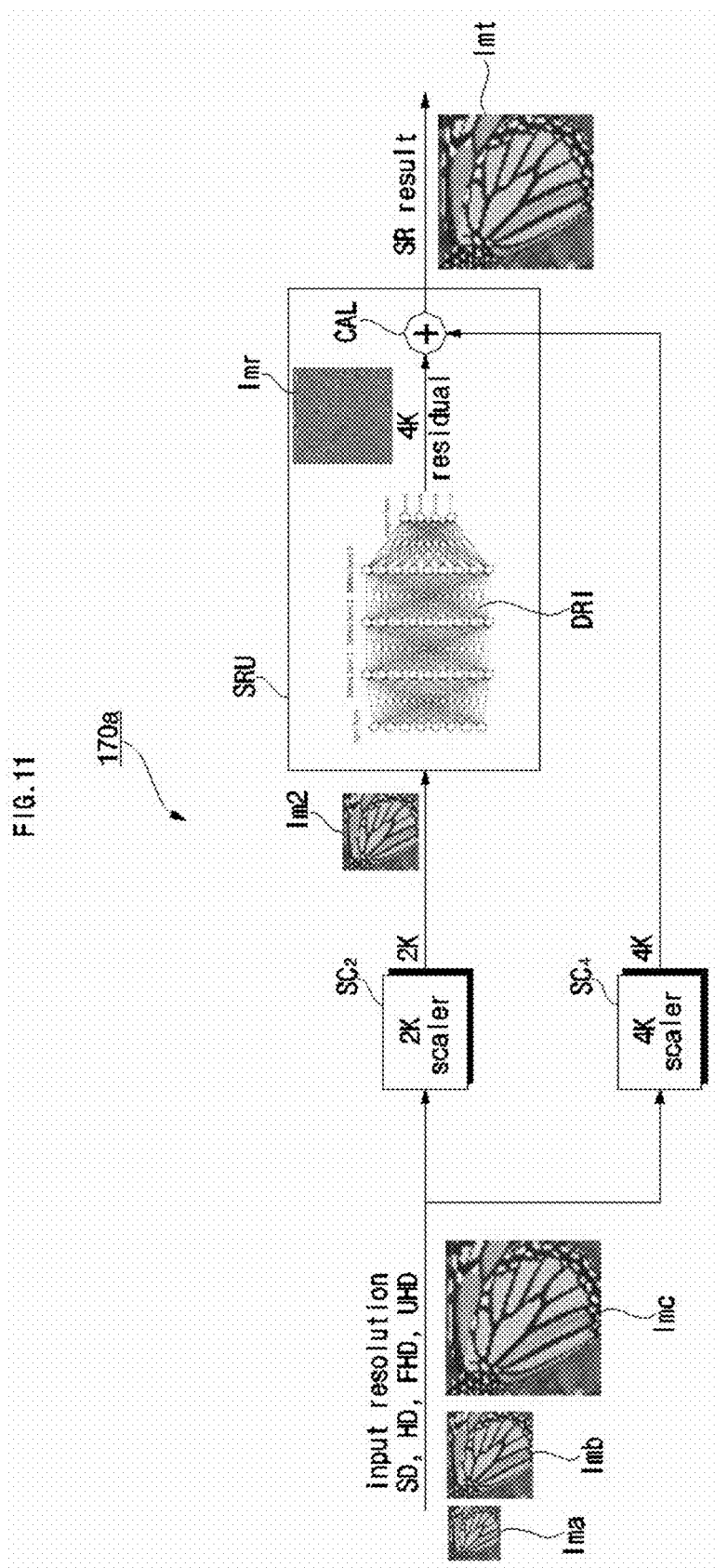
FIG. 11 is a view illustrating an example of an internal block diagram of a signal processor according to an embodiment of the present disclosure.

A first method of the deep learning-based super resolution (SR) according to an embodiment of the present disclosure is a method of obtaining a difference between a final target image and an image created by an image quality engine by deep learning as shown in FIG. 11.

That is, the first method is a method of obtaining a reference image and a difference image and then adding the reference image and the differential image. First, the deep learning method is not applied to the reference image. A difference between this image and a final target image is calculated by a deep learning network which inputs a normalized image at a first resolution and outputs a residual, regardless of the input resolution.

According to the first method, it is possible to provide backward compatibility by securing the reference image and a deep learning block that consumes much power due to an increase in calculation and external memory access compared to the existing algorithm in some cases may be advantageously turned off.

Meanwhile, according to the first method, from the viewpoint of image quality, by learning the high frequency band by deep learning, even when the original resolution is the second resolution (e.g., 4K), an effect of further improving resolution or a method of applying different image quality processing may be expected. In addition, from a tuning point of view, it is easy to adjust performance strength by scaling the difference value when adding the reference image and the residual image. Meanwhile, as advancement, it may also be possible to include the process of combining the two data in the deep learning network.

Figure 12:
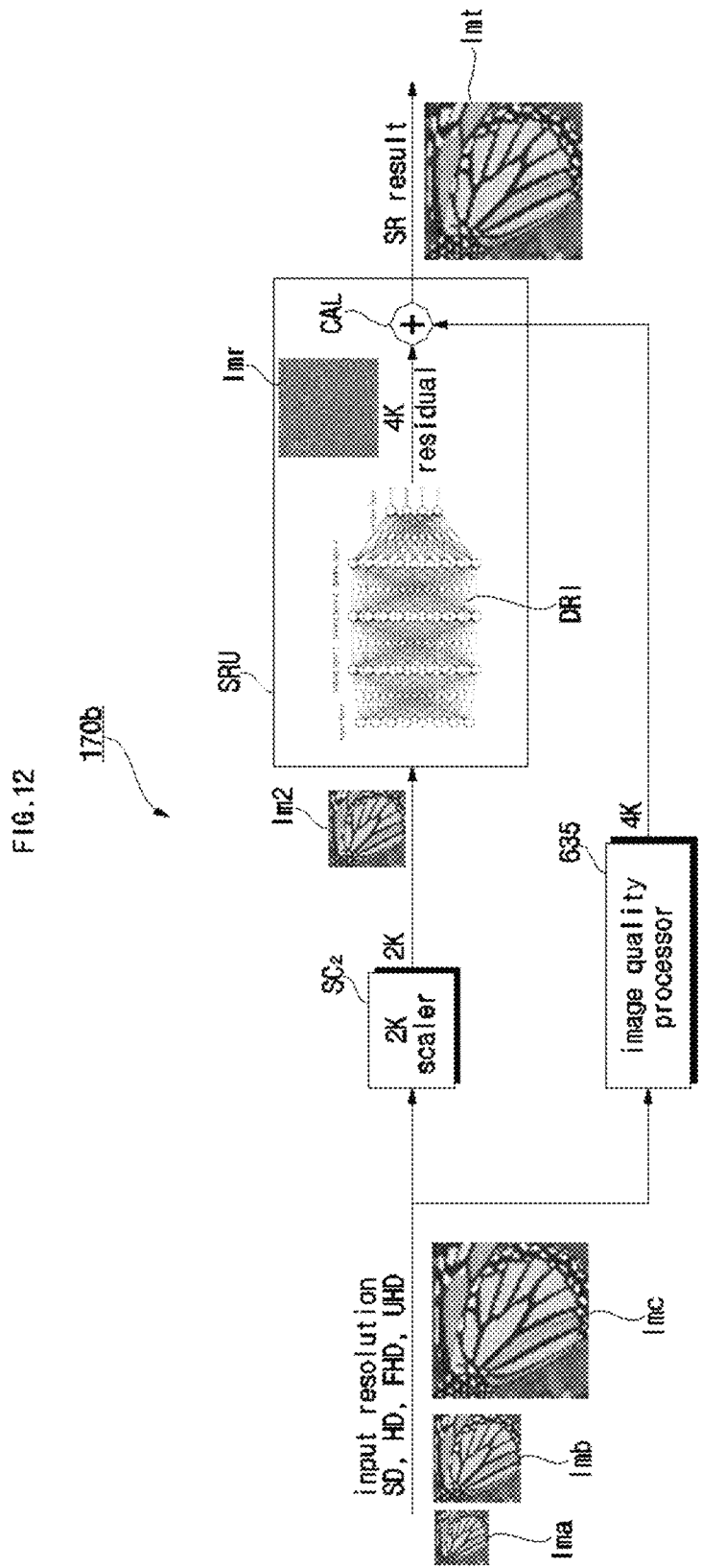
FIG. 12 is a view illustrating an example of an internal block diagram of a signal processor according to another embodiment of the present disclosure.

Meanwhile, as shown in FIG. 12, the second method of the deep learning-based super resolution (SR) according to an embodiment of the present disclosure uses a normalized input.

According to the second method, both SD and HD, whose resolution of an input image is smaller than FHD are normalized to the first resolution (e.g., 2K), which is an intermediate resolution, and a deep learning network may be applied to SD/HD/FHD and UHD.

The second method is similar to a third method to be described later, but is differentiated in that the scaler of the image quality engine and the super resolution (SR) are used together.

In addition, since the number of deep learning models required as a first algorithm for SD/HD/FHD and a second algorithm for UHD decreases, a memory region required to store a synapse weight to be used in each model, that is, HW resource, is relatively small compared to the third method.

In addition, in the case of streaming service, since the first algorithm is continuously selected and used even if the input resolution of the same content changes between SD and FHD depending on transmission network conditions, so a change in image quality according to model selection according to the change in the input resolution may be considered to be small.

According to the second method, it is possible to improve image quality by interworking with the image quality processor 635 in charge of image quality processing such as scaler, sharpness, and the like, rather than the super resolution (SR) alone.

Figure 13:
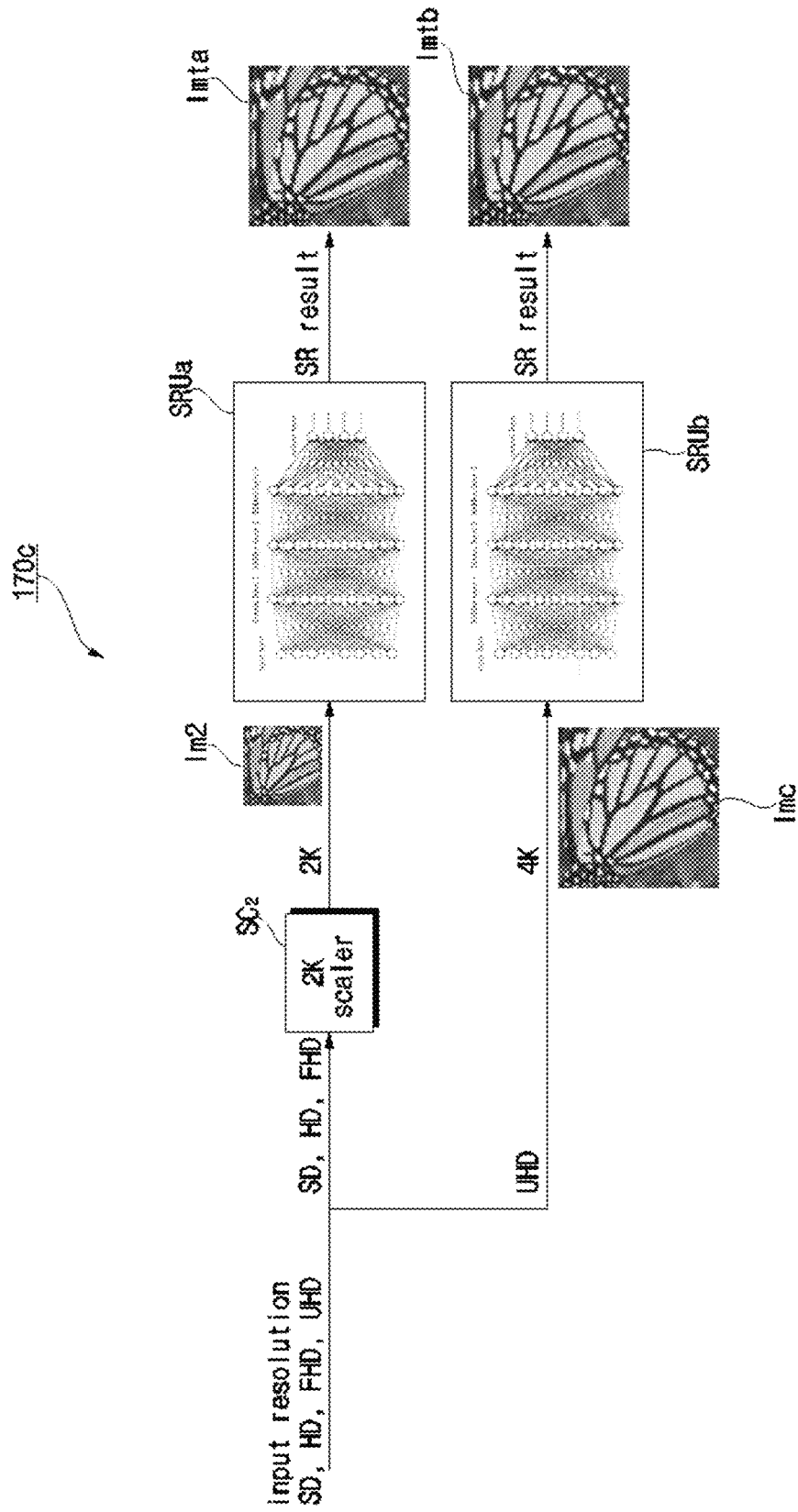
FIG. 13 is a view illustrating an example of an internal block diagram of a signal processor according to another embodiment of the present disclosure.

Meanwhile, the third method of the deep learning-based super resolution (SR) according to an embodiment of the present disclosure is a method of applying a separate deep learning structure according to resolution of the input image as shown in FIG. 13.

According to the third method, it has four deep learning super resolution (SR) networks from SD to UHD, and one of them is selected and used according to the input resolution.

As shown in Table 100 of FIG. 9, if FHD is input, there are a total of three possible original resolutions: SD, HD, and FHD, so a network model learned with a dataset included in this category is required.

In addition, the case of applying each deep learning model is limited compared to the entire case, so each case has the advantage of obtaining the optimal image quality and may be considered to be effective in scenarios applied to pictures or photos as well as videos.

Meanwhile, according to an embodiment of the present disclosure, a deep learning super resolution (SR) algorithm may be changed.

Super resolution (SR) is a technology that creates a desired high-resolution image from an input low-resolution image. In the case of deep learning, as the more various images are used for learning, more stable results may be produced.

However, there is a limitation in acquiring learning data because the resolution, image quality level, and noise level of the images provided in each country are different and the characteristics of the mainly input images may change due to changes in the contents provider and broadcasting system in the future.

In this regard, if an initial model with a dataset of a certain size and then a super resolution (SR) model is updated by region and by a certain period, image quality performance may be maintained and improved.

Meanwhile, according to an embodiment of the present disclosure, a basic network structure may be changed through updating.

According to an embodiment of the present disclosure, the super resolution (SR) block may be changed in a variety of super resolution (SR) network structures within calculation performance allowed by an SR IP, GPU, or deep learning-dedicated chip, and processor and an external memory bandwidth that a system may support.

Since a difference in performance that may be obtained by changing the structure itself is higher than a method of updating the synapse weight, it is desirable to extend the system change items using SW update to the deep learning structure.

Meanwhile, according to an embodiment of the present disclosure, the SR network synapse weight may be changed to software update (SW update) of the image display apparatus 100.

The deep learning algorithm may improve quality performance by reinforcing a learning dataset and extending learning, and here, a newly updated parameter may be included in software of the image display apparatus 100 and updated.

Meanwhile, there may be various examples of the deep learning model parameter, such as it may be included in a program binary when software of a system OS is updated according to a size or system policy or a method of updating a storage area in a nonvolatile memory such as flash or the like.

Meanwhile, according to an embodiment of the present disclosure, the SR network weight may be updated through learning in the system.

In learning the deep learning algorithm, in case of the super resolution (SR), a learning image database including a high-definition image to be finally output and a low-resolution image quality actually input to the image display apparatus 100 is required.

Also, the weight may be updated by calculating an error of a current model using the database DB. The updated weight may be stored in a hardware or an SW module. To this end, if a learning database (DB) is configured according to the viewer's environment (country, images viewed mainly), the model given to the system may be updated by default.

Meanwhile, according to an embodiment of the present disclosure, an input image resolution is predicted and if the corresponding image is determined to be a high-resolution image, it may be used as data for learning.

Figure 16:
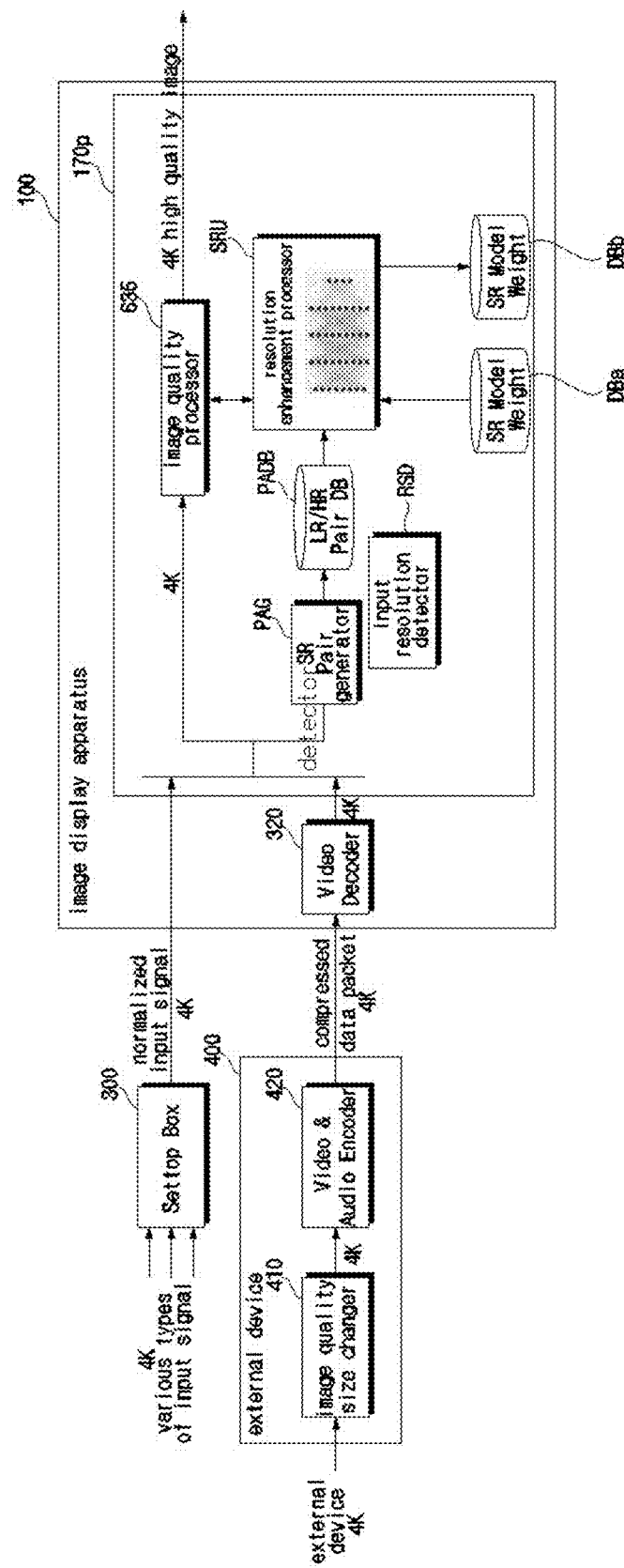
Figure 17:
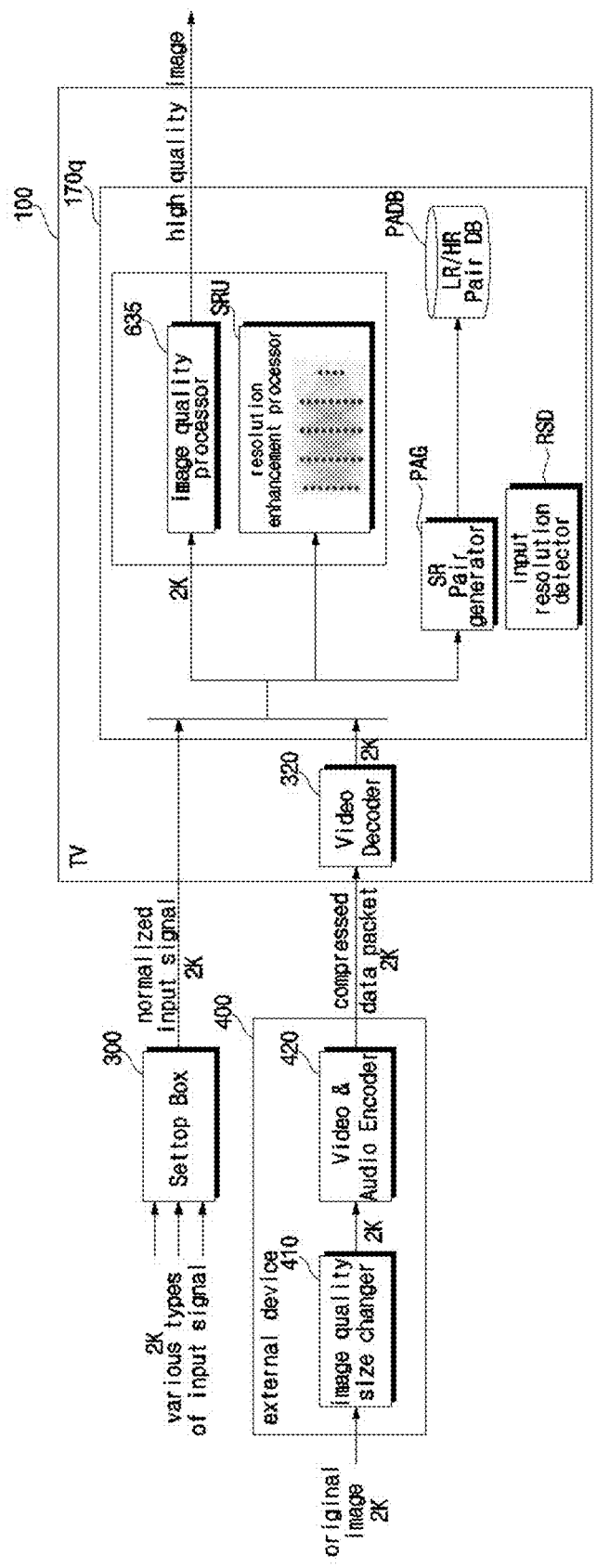

To this end, the present disclosure may further include an input resolution detector RSD as shown in FIGS. 16 and 17 in addition to SR Inference and SR Training.

Also, when the input resolution detector RSD determines that the input image is sufficiently high quality, the image may be determined as a target of training learning to configure a training DB.

Meanwhile, the input resolution detector RSD may be provided in the image analyzer 610 of FIG. 7.

Meanwhile, according to an embodiment of the present disclosure, a low-resolution image is generated from an input image and used for deep learning.

Specifically, a low-resolution image to be used as a learning input may be generated from a target image of the learning database DB.

A modification having similarity to the actual image display apparatus 100 may be obtained by modeling general Image downscaling, blocking by noise compression, and the like.

Here, since the learning only needs a block size, which is sufficient for learning, rather than the entire image, it is also possible to separately extract and use a meaningful area in the image.

In addition, it is possible to include a technique for converting a low-resolution image from a high-resolution image by analyzing when a low-resolution image other than a high-resolution image is input.

Meanwhile, according to an embodiment of the present disclosure, the modified input image and the high-resolution image may be used as a dataset, and a portion thereof may be updated.

For example, a training DB may be generated by configuring a set of high resolution image block and a low resolution image block matched thereto as a dataset.

In this case, the training DB must include more than a predetermined number so that the deep learning model is trained, and a dedicated memory for this may be added to the system.

In addition, when the data set reaches a certain size, a portion thereof may be continuously changed as necessary, rather than stopping updating, whereby deep learning may be performed while optimizing a size of the date set and a storage location therefor.

In addition, the data set may be basically included in the storage device in the image display apparatus 100 when the product is released, or when a network is connected, it may be updated through a data server.

In addition, it may also be possible to analyze a level of an image viewed by a viewer through the input image resolution analyzer RSD, and selectively download a data set through the data server accordingly.

Meanwhile, according to an embodiment of the present disclosure, the signal processor 170 may include a training module or a processor capable of performing the same.

Specifically, the signal processor 170 may include a deep learning dedicated processor or a system including IP.

Meanwhile, in order to perform a deep learning network in a deep learning dedicated processor or a processor capable of performing deep learning, it is efficient to control in a program form to support a network structure that may be transformed in the future or various other applications.

This is possible in several levels of implementation, and there may be a simple way to sequentially set and complete internal blocks through a deep learning processor interrupt in a CPU or a small processor for the image quality engine. In addition, a processor method that processes instructions with program decoders, program counters, and the like in the deep learning engine with program memory may also be suitable for complex networks.

Meanwhile, according to an exemplary embodiment of the present disclosure, the signal processor 170 may be applied to various image quality processing.

For example, the HW processing the super resolution (SR) image quality described in the present disclosure may have a dedicated chip, a processor such as CPU/GPU/NPU, or an IP type.

Meanwhile, since the corresponding HW is controlled in the form of a program, a processing field thereof need not be limited to the image SR. However, in the future, it may be used for a corresponding image quality processing by replacing a program in applications such as image style transfer or noise removal.

Meanwhile, according to an embodiment of the present disclosure, the signal processor 170 may be extended to various systems.

In the present disclosure, a case in which the final input image is 4K is exemplified, but the present disclosure is not limited thereto, and may be extended and applied to various other image display apparatuses such as 8 KTV or a signage using multiple displays.

Figure 10:
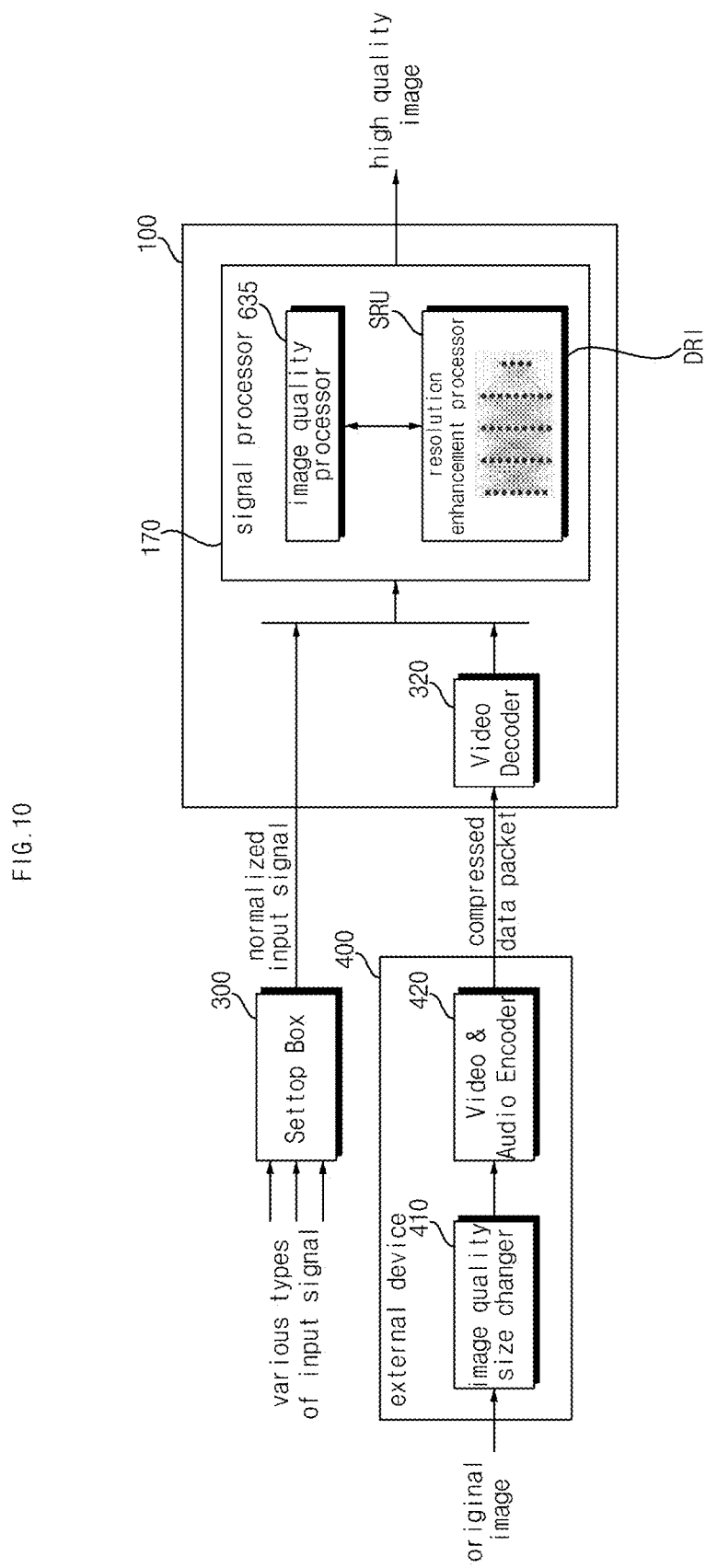
FIG. 10 is a view illustrating an example of an internal block diagram of an image display apparatus according to an embodiment of the present disclosure.

FIG. 10 is a view illustrating an example of an internal block diagram of an image display apparatus according to an embodiment of the present disclosure.

Referring to the drawings, an image display apparatus 100 according to an embodiment of the present disclosure receives an input image through a set-top box 300 or an external device 400.

The set-top box 300 may receive a broadcast signal or an external image signal and may receive and process image signals of various resolutions and transmit the same to the image display apparatus 100.

The external device 400 may include an image quality size changer 410 for changing image quality and image size of an original image, an encoder 420 for encoding video and audio, and transmit input images of various resolutions to the image display apparatus 100.

Here, the external device 400 may be a game device, a multimedia player, or the like, and further, may be a streaming server connected to a network.

The image display apparatus 100 may include a decoder 320 for decoding an input image from the external device 400, and a signal processor 170 for processing signals for input images of various resolutions.

The signal processor 170 according to an embodiment of the present disclosure may include a resolution enhancement processor SRU that improves resolution of input images of various resolutions and an image quality processor 635 performing image quality processing on the image having a resolution improved in the resolution enhancement processor SRU The image quality processor 635 may correspond to the image quality processor illustrated in FIG. 7.

Meanwhile, the resolution enhancement processor SRU of FIG. 10 may be different from first to third resolution enhancement processors 735, 738, and 742 in the image quality processor in FIG. 7.

Meanwhile, the resolution enhancement processor SRU of FIG. 10 exemplifies that it is separate from the image quality processor 635, but, unlike this, the resolution enhancement processor SRU may be provided in the image quality processor 635 to correspond to the first to third resolution enhancement processors 735, 738, and 742.

Meanwhile, the decoder 320 of FIG. 10 may be provided in the signal processor 170.

☐Hereinafter, a structure of the signal processor 170 of FIG. 10 will be mainly described.

As shown in FIG. 9, in order to display a high-resolution image compared to the original image resolution, the signal processor 170 in the image display apparatus 100 according to the embodiment of the present disclosure may improve the resolution for an input image by various methods. This will be described with reference to FIG. 11 below.

FIG. 11 is a view illustrating an example of an internal block diagram of a signal processor according to an embodiment of the present disclosure.

Referring to FIG. 11, various input images Ima, Imb, and Imc, such as SD, HD, FHD, and UHD, may be input to the signal processor 170a.

The signal processor 170a according to an embodiment of the present disclosure may include a scaler SC2 that scales input images of various resolutions to a first resolution and a resolution enhancement processor SRU for generating a first image having a second resolution higher than the first resolution by performing learning on the input image Im2 having the first resolution.

In this case, the first resolution may be 2K resolution, and the second resolution may be 4K resolution. Meanwhile, the first image may correspond to a residual image of a second resolution.

Accordingly, even when input images of various resolutions are input, the resolution may be stably improved. In particular, even when input images of various resolutions are input and there is no resolution information of the input images, the resolution may be stably improved.

Meanwhile, the scaler SC2 may perform various image quality processing such as noise removal, sharpness, and deinterlaced in addition to changing the image size.

Meanwhile, the resolution enhancement processor SRU according to an embodiment of the present disclosure ma output a third image Imt having the second resolution based on the input second image having the second resolution and the first image corresponding to the residual image having the second resolution. Accordingly, even when input images of various resolutions are input, the resolution may be stably improved.

Meanwhile, the resolution enhancement processor SRU may include a learning interference processor DRI performing learning interference based on the input image having the first resolution and a super resolution-based learning model and a calculator CAL calculating a difference between a resultant image according to the learning interference and the second image having the second resolution and outputting a third image having the second resolution.

Specifically, the resolution enhancement processor SRU performs learning inference processor based on an input image having the first resolution and a super resolution learning model, and output a third image Imt having the second resolution based on a difference (error) between a resultant image Imr according to the learning inference processor and the second image having the second resolution.

The resultant image Imr here may correspond to a residual image of the second resolution.

Meanwhile, when the resolution of the input image is the second resolution, the input image of the second resolution may be input to the resolution enhancement processor SRU as it is.

Meanwhile, when the resolution of the input image is not the second resolution, a second scaler SC4 that scales to the second resolution is further required.

Accordingly, the signal processor 170a according to an embodiment of the present disclosure may further include a second scaler SC4 that scales input images of various resolutions to the second resolution.

In this case, the second image having the second resolution output from the second scaler SC4 may be input to the resolution enhancement processor SRU. Accordingly, even when input images of various resolutions are input, the resolution may be stably improved.

Meanwhile, the second resolution may be varied according to a setting. For example, various resolutions such as 4K and 8K may be set according to a second resolution setting item in a menu provided by the image display apparatus 100.

According to the setting, the signal processor 170 receives a setting input, and according to the setting input, the resolution enhancement processor SRU selects an SR model weight corresponding to the second resolution performs leaning using the selected SR model weight, and generates an image having the set second resolution according to a learning result. Accordingly, it is possible to stably improve the resolution to the second resolution desired by the user.

Meanwhile, the resolution enhancement processor SRU may use a plurality of SR model weights, and in particular, may store SR model weights for each resolution or use SR model weights for each resolution stored in the memory.

FIG. 12 is a view illustrating an example of an internal block diagram of a signal processor according to another embodiment of the present disclosure.

Referring to FIG. 12, various input images Ima, Imb, and Imc, such as SD, HD, FHD, and UHD, may be input to the signal processor 170b.

The signal processor 170b according to an embodiment of the present disclosure includes a scaler SC2 that scales input images of various resolutions to a first resolution, a resolution enhancement processor SRU that performs learning on the input image Im2 having the first resolution from the scaler SC2 to generate a first image having the second resolution higher than the first resolution, and an image quality processor 635 that scales the input images of various resolutions to the second resolution. In addition, the second image having the second resolution output from the image quality processor 635 may be input to the resolution enhancement processor SRU.

In this case, the first resolution may be 2K resolution, and the second resolution may be 4K resolution. Meanwhile, the first image may correspond to a residual image of the second resolution.

Accordingly, even when input images of various resolutions are input, the resolution may be stably improved. In particular, resolution may be stably improved even when input images of various resolutions are input but there is no resolution information of the input images.

Meanwhile, the resolution enhancement processor SRU according to an embodiment of the present disclosure may output the third image Imt having the second resolution based on the input second image having the second resolution and the first image corresponding to the residual image of the second resolution. Accordingly, resolution may be stably improved even when input images of various resolutions are input.

Meanwhile, the resolution enhancement processor SRU may include a learning interference processor performing learning interference based on the input image having the first resolution and the super resolution learning model and a calculator CAL calculating a difference between a resultant image according to the learning interference and the second image having the second resolution.

Specifically, the resolution enhancement processor SRU performs learning inference processor based on the input image having the first resolution and the super resolution learning model and output the third image Imt having the second resolution based on a difference (error) between the resultant image Imr according to the learning inference processor and the second image having the second resolution.

The resultant image Imr here may correspond to a residual image of the second resolution.

Meanwhile, when the resolution of the input image is the second resolution, the input image of the second resolution may be input to the resolution enhancement processor SRU as it is.

FIG. 13 is a view illustrating an example of an internal block diagram of a signal processor according to another embodiment of the present disclosure.

Referring to FIG. 13, various input images Ima, Imb, and Imc such as SD, HD, FHD, and UHD may be input to the signal processor 170c.

The signal processor 170c according to an embodiment of the present disclosure may include includes a scaler SC2 that scales input images of various resolutions to a first resolution, a resolution enhancement processor SRU that performs learning on the input image Im2 having the first resolution from the scaler SC2 and generates a first image having the second resolution higher than the first resolution, and a second resolution enhancement processor SRUb that generates a fourth image Imtb having the second resolution by performing learning on the image having the second resolution among the input images of various resolutions.

Meanwhile, the resolution enhancement processor SRU according to an embodiment of the present disclosure may output the third image Imt having the second resolution based on the first image corresponding to a residual image of the second resolution. Accordingly, resolution may be stably improved even when input images of various resolutions are input.

In this case, the first resolution may be 2K resolution, and the second resolution may be 4K resolution. Meanwhile, the first image may correspond to a residual image of the second resolution.

Accordingly, the resolution enhancement processor SRU improves the resolution from the SD to FHD-based input image to a 4K image, and the second resolution enhancement processor SRUb may improve resolution from the UHD-based 4K input image into a 4K image. As a result, by performing separate image resolution enhancement according to the input resolution, it is possible to stably improve the image resolution.

Meanwhile, the resolution enhancement processor SRU and the second resolution enhancement processor SRUb in FIG. 13 may include a learning interference processor DRI performing learning interference based on a super resolution learning model.

Specifically, the resolution enhancement processor SRU and the second resolution enhancement processor SRUb perform learning inference based on the input image having the first resolution and the super resolution learning model, and output images having improved resolution based on a resultant image according to the learning interference.

Figure 14:
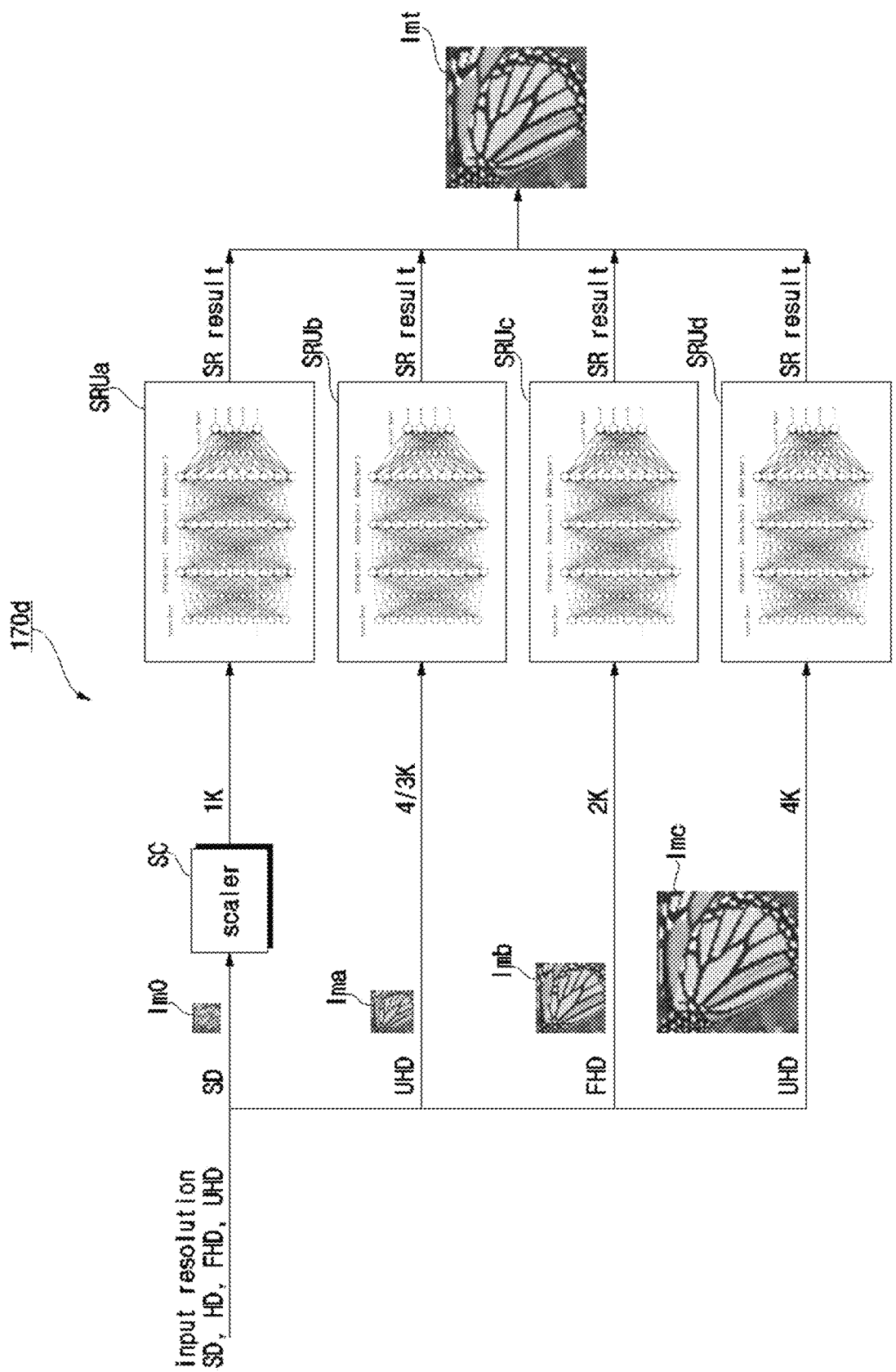
FIG. 14 is a view illustrating an example of an internal block diagram of a signal processor according to another embodiment of the present disclosure.

FIG. 14 is a view illustrating an example of an internal block diagram of a signal processor according to another embodiment of the present disclosure.

Referring to FIG. 14, various input images Ima, Imb, and Imc such as SD, HD, FHD, and UHD may be input to a signal processor 170d.

The signal processor 170d according to an embodiment of the present disclosure may include a first resolution enhancement processor SRUa performing learning on an input image having a first resolution and generating a first image having a second resolution higher than the first resolution, a first resolution enhancement processor SRUa performing learning on an input image having a first resolution and generating a first image having a second resolution higher than the first resolution, a second resolution enhancement processor SRUb performing learning on an input image having a third resolution and generating a second image having the second resolution higher than the third resolution, and a third resolution enhancement processor SRUd performing learning on an input image having the second resolution and generating a third image having the second resolution higher than the first resolution, In this case, the first resolution may be 1K resolution, the second resolution may be 4K resolution, and the third resolution may be 4/3K resolution.

That is, the first resolution enhancement processor SRUa may perform learning on the input image having a 1K resolution to improve the resolution based on the second resolution, the second resolution enhancement processor SRUb may perform learning on the input image Ima having the third resolution 4/3K to improve the resolution based on the second resolution, and the third resolution enhancement processor SRUd may perform learning on the input UHD image Imc to improve resolution based on the second resolution. Accordingly, it is possible to perform stable resolution enhancement based on each resolution.

Meanwhile, the signal processor 170d according to an embodiment of the present disclosure may further include a scaler SC that scales the input image Im0 having SD resolution and outputs the input image having the first resolution.

Meanwhile, the signal processor 170d according to an embodiment of the present disclosure may further include a fourth resolution enhancement processor SRUc performing learning on an input image having a fourth resolution and generating a fourth image having the second resolution higher than the fourth resolution. Here, the fourth resolution may be 2K resolution.

That is, the fourth resolution enhancement processor SRUc may perform learning on the input image Imb having a 2K resolution to improve resolution based on the second resolution. As a result, by performing separate image resolution enhancement according to the input resolution, it is possible to stably improve the image resolution.

Accordingly, resolution may be stably improved even when input images of various resolutions are input. In particular, resolution may be stably improved even when input images of various resolutions are input but there is no resolution information of the input images.

FIGS. 15A to 20B are views referenced in the description of FIGS. 11 to 14.

Figure 15A:
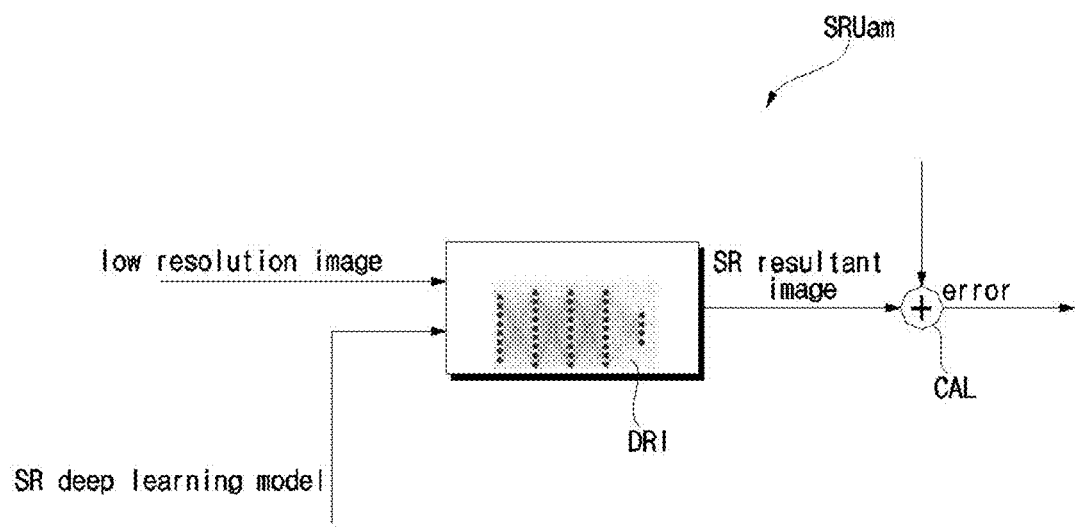
FIGS. 15A to 20B are views referenced for the description of FIGS. 11 to 14.

First, FIG. 15A is a view illustrating an example of a resolution enhancement processor of FIGS. 11 to 14.

Referring to FIG. 15A, a resolution enhancement processor SRUam may include a learning inference processor DRI that performs learning inference processor based on an input image having the first resolution and a super resolution learning model and a calculator (CAL) calculating a difference value between a resultant image according to the learning inference processor and the second image having the second resolution.

That is, the resolution enhancement processor SRUam may perform learning inference based on an input image having the first resolution and the super resolution learning model, and output a third image having the second resolution based on the difference between the resultant image according to the learning inference processor and the second image having the second resolution.

Accordingly, resolution may be stably improved even when input images of various resolutions are input.

Figure 15B:
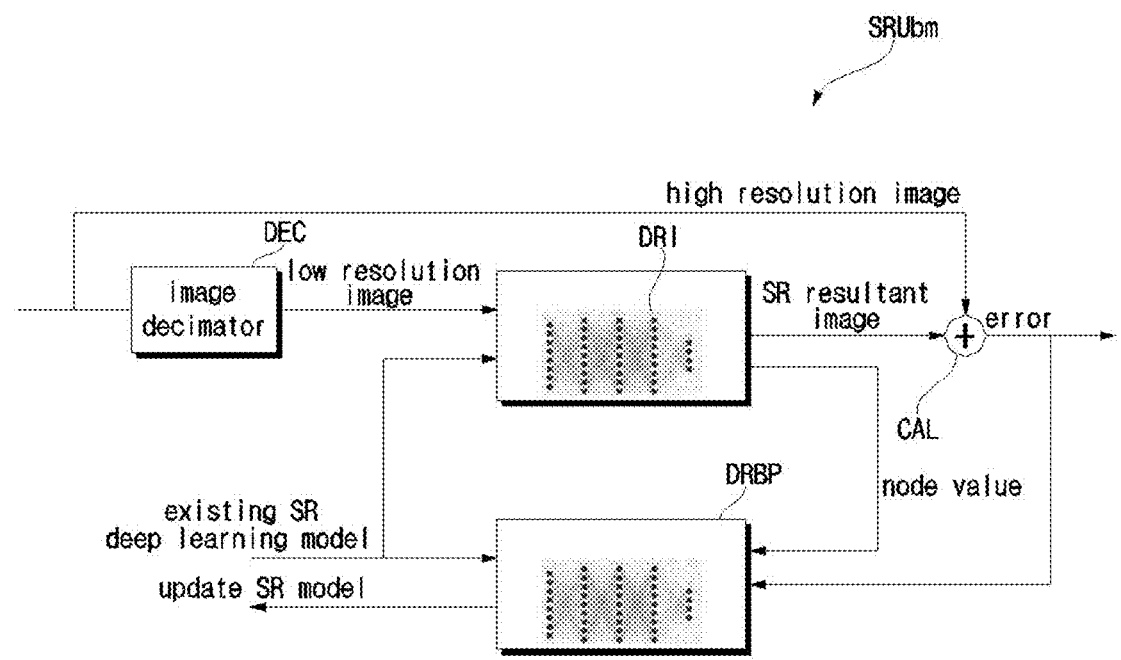

Next, FIG. 15B is a view illustrating another example of the resolution enhancement processor of FIGS. 11 to 14.

Referring to FIG. 15B, a resolution enhancement processor SRUbm includes a learning inference processor DRI that performs learning inference processor based on an input image having the first resolution and a super resolution learning model, a calculator CAL calculating a difference between a resultant image according to the learning inference processor and the second image having the second resolution, and a learning updating processor DRBP performing leaning for weight updating based on a node value from the learning interference processor and the difference value (error).

Meanwhile, the resolution enhancement processor SRUbm may further include an image decimator DEC that converts an input high-resolution image into a low-resolution image.

The learning updating processor DRBP performs learning for weight updating based on a node value and a difference value (error) from the learning inference processor DRI and outputs a parameter value related to an update super resolution model.

Meanwhile, the learning inference processor DRI may update the learning model based on a parameter value from the learning updating processor DRBP.

That is, the resolution enhancement processor SRUbm may perform learning inference based on the input image having the first resolution and the super resolution learning model, calculate a difference value between a resultant image according to the learning interference and the second image having the second resolution, perform learning for weight updating based on the node value from the learning interference processor DRI and the difference value, and update the learning model based on the parameter value output according to the result of weight updating.

Accordingly, even when input images of various resolutions are input, the resolution may be stably improved.

Figure 15C:
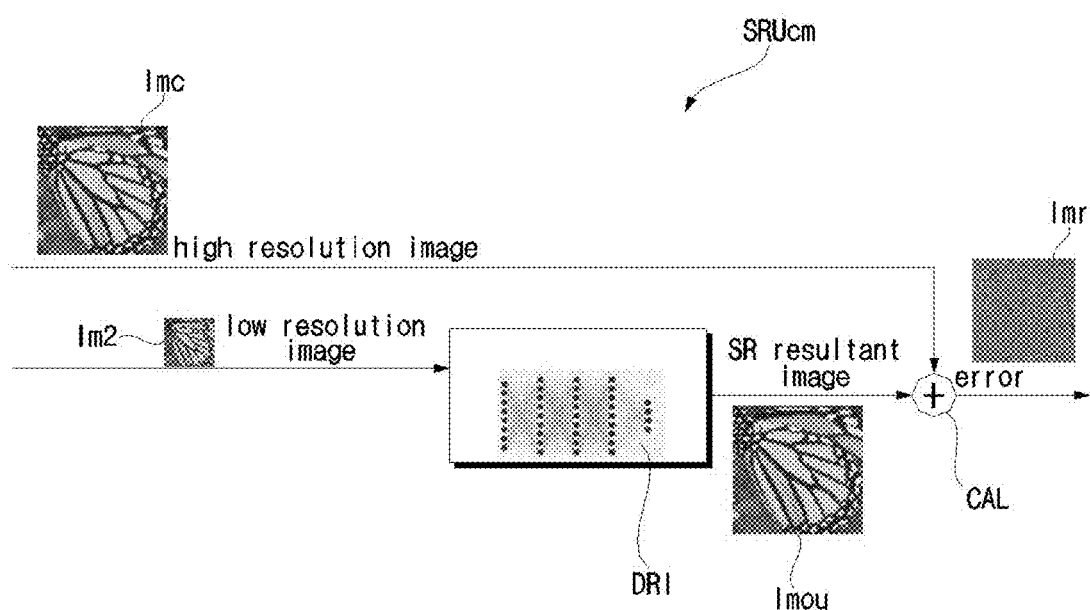

Next, FIG. 15C is a diagram showing another example of the resolution enhancement processor of FIGS. 11 to 14.

Referring to FIG. 15C, a resolution enhancement processor SRUcm includes a learning inference processor DRI that performs learning inference processor based on the input image Im2 having first resolution and the super resolution learning model, and a calculator CAL that calculates a difference value (error) between a resultant image Imou according to the learning inference processor and the second image having the second resolution, which is a high resolution, and outputs an image Imr having improved resolution based on the difference value.

Accordingly, even when input images of various resolutions are input, the resolution may be stably improved.

FIG. 16 is a view illustrating an example of an internal block diagram of an image display apparatus according to another embodiment of the present disclosure.

Referring to the drawings, an image display apparatus 100 according to another embodiment of the present disclosure receives an input image through the set-top box 300 or the external device 400.

The set-top box 300 may receive a broadcast signal or an external image signal, receive and process image signals of various resolutions, and transmit the received image signal to the image display apparatus 100.

The external device 400 may include an image quality size changer 410 for changing image quality and image size of an original image and an encoder 420 encoding video and audio, and may transmit input images of various resolutions to the image display apparatus 100.

The image display apparatus 100 may include a decoder 320 that decodes an input image from the external device 400 and a signal processor 170p that performs signal processing for input images of various resolutions.

The signal processor 170p according to an embodiment of the present disclosure may include a resolution enhancement processor SRU that improves resolution of input images of various resolutions, an image quality processor 635 that performs image quality processing on the image having the resolution improved by the resolution enhancement processor SRU, and a resolution detector RSD that detects the resolution of the input image.

Meanwhile, the signal processor 170p according to an embodiment of the present disclosure may include a plurality of resolution image generators PAG that generates a plurality of resolution images for input images, a database PADB that stores data for the plurality of resolution images, a first weight memory DBa that stores a first weight, and a second weight memory DBb that stores a second weight.

The plurality of resolution image generators PAG may include, for example, a scaler SC2 of FIG. 11 that scales input images of various resolutions to the first resolution, a second scaler SCR of FIG. 11 that scales the input images of various resolutions to the second resolution, or the image quality processor 635 of FIG. 12.

That is, the plurality of resolution image generator PAG may output the input images of various resolutions input as an image having the first resolution and an image having the second resolution.

The database PADB may store information on the image having the first resolution and the image having the second resolution output from the plurality of resolution image generators PAG.

In addition, the database PADB may transmit the stored information on the image having the first resolution and the image having the second resolution to the resolution enhancement processor SRU.

The resolution enhancement processor SRU may perform learning on the input image having the first resolution based on the image having the first resolution and the image having the second resolution from the plurality of resolution image generators PAG and information from the database PADB to generate the first image having the second resolution higher than the first resolution, and may output a third image having the second resolution based on the input second image having the second resolution and the first image corresponding to a residual image of the second resolution.

Meanwhile, the resolution enhancement processor SRU may perform learning using the second weight from the first weight memory DBa and perform control to store the updated weight in the second weight memory DBb.

Meanwhile, in FIG. 16, it is illustrated that the resolution of the input image input from the set-top box 300 or the external device 400 is 4K corresponding to the second resolution.

□When the resolution of the input image detected through the resolution detector RSD is the second resolution, the resolution enhancement processor may perform learning using the second weight from the first weight memory DBa and perform control to store the updated weight in the second weight memory DBb.

That is, when the resolution of the input image detected by the resolution detector RSD is the second resolution, the plurality of resolution image generators PAG generates the input images having the second resolution as an input image having the first resolution and a second image having the second resolution, and the resolution enhancement processor SRU may update the weight in the learning model based on the input image having the first resolution and the second image having the second resolution.

FIG. 17 is a view illustrating an example of an internal block diagram of an image display apparatus according to another embodiment of the present disclosure.

Referring to FIG. 17, the image display apparatus 100 according to another embodiment of the present disclosure receives an input image through the set-top box 300 or the external device 400 and a signal processor 170*q* performs signal processing on the input image.

Meanwhile, the signal processor 170*q* according to an embodiment of the present disclosure may include a resolution enhancement processor SRU improving resolution of input images of various resolutions, an image quality processor 635 performing image quality processing on the images having resolution improved by the resolution enhancement processor SRU, and a resolution detector RSD detecting the resolution of the input image.

Meanwhile, the signal processor 170*q* according to an embodiment of the present disclosure may further include a plurality of resolution image generators PAG that generate a plurality of resolution images for the input images and a database PADB storing data for the plurality of resolution images.

The plurality of resolution image generators PAG may include, for example, a scaler SC2 of FIG. 11 that scales input images of various resolutions to the first resolution, a second scaler SCR of FIG. 11 that scales the input images of various resolutions to the second resolution, or the image quality processor 635 of FIG. 12.

That is, the plurality of resolution image generator PAG may output the input images of various resolutions input as an image having the first resolution and an image having the second resolution.

The database PADB may store information on the image having the first resolution and the image having the second resolution output from the plurality of resolution image generators PAG.

In addition, the database PADB may transmit the stored information on the image having the first resolution and the image having the second resolution to the resolution enhancement processor SRU.

Meanwhile, in FIG. 17, it is illustrated that the resolution of the input image input from the set-top box 300 or the external device 400 is 2K corresponding to the first resolution.

When the resolution of the input image detected by the resolution detector RSD is the second resolution, the plurality of resolution image generators PAG may generate the input images having the second resolution as the input image having the first resolution and a second image having the second resolution.

The resolution enhancement processor SRU may perform learning on the input image having the first resolution based on the image having the first resolution and the image having the second resolution from the plurality of resolution image generators PAG and information from the database PADB to generate the first image having the second resolution higher than the first resolution, and may output a third image having the second resolution based on the input second image having the second resolution and the first image corresponding to a residual image of the second resolution.

Meanwhile, the image having the first resolution output from the plurality of resolution image generators PAG may be a high-resolution image (HR image) and the image having the second resolution may be a low-resolution image (LR image).

Figure 18A:
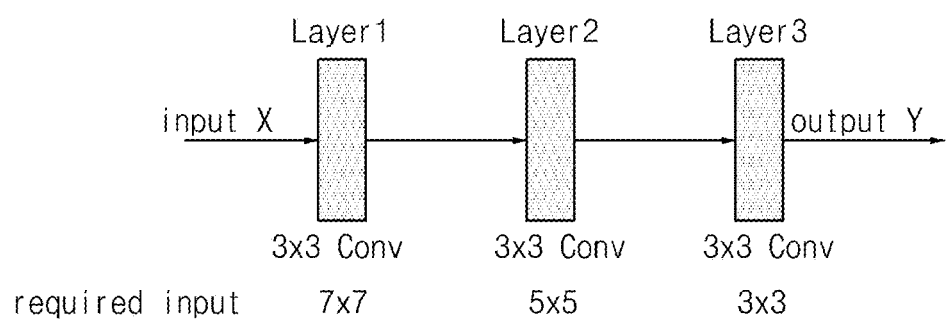
Figure 18B:
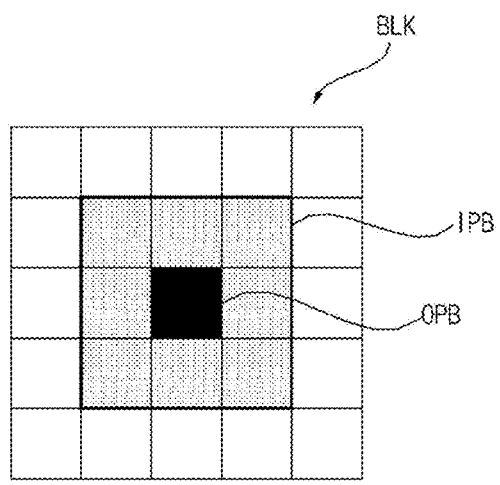

FIGS. 18A to 18B are views referenced for explaining a method of generating a low-resolution image (LR image) from a high-resolution image (HR image).

In the case of an inference model, all pixel results are used by processing the entire image, and intermediate data of all nodes and channels of each layer must be stored for training.

Therefore, if all images are used as training data at a time, the amount of data to be stored becomes very large.

Therefore, it is preferable to use a method of cutting an image with a patch and performing a training data set for each smaller image. Here, the size of the patch must be larger than the size including the input that affects the result.

For example, as shown in FIG. 18A, when there is a continuous 3×3 convolution 3 layer, the final 1 pixel requires a 3×3 input of Layer 3, and Layer 2 requires a 5×5 input to create 3×3, and Layer 1 requires a 7×7 input to create 5×5.

Meanwhile, as shown in FIG. 18B, in case of performing 3×3 convolution, 3×3 input data such as IPB is required, and accordingly, 1×1 data such as OPB may be output.

In other words, in the learning process in FIG. 18A, a patch of 7×7 or more is input, so that training errors may be used as training data if applied only to the center pixel.

The input size to be inversely estimated here corresponds to a minimum condition of the patch size that the deep learning block may support, and the actual size may be determined according to a limit supported by the deep learning block.

Figure 19:
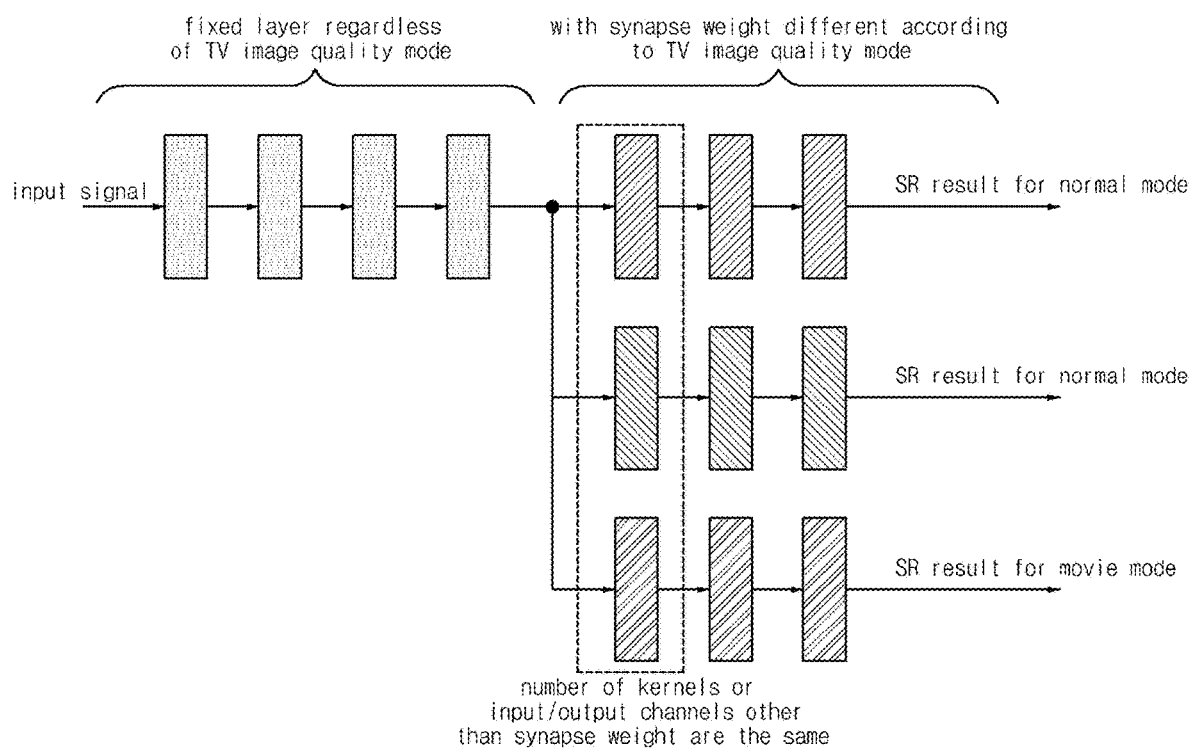

FIG. 19 is a diagram referenced to describe a method for improving a resolution based on learning according to image quality setting.

Referring to FIG. 19, the learning interference processor DRI in the resolution enhancement processor SRU may include a layer fixed regardless of a quality mode and a layer changed according to an image quality mode.

The learning inference processor DRI in the resolution enhancement processor SRU has the same kernel size, number of channels, etc. of layers that are changed according to the image quality mode, but network parameters may be optimized, while supporting various image quality modes by using different synapse weights according to each mode. Accordingly, a difficulty of implementing the system may be reduced.

For example, when the image quality mode is classified into a normal mode, a clear mode, and a movie mode, as shown in FIG. 18C, a synapse weight may be partially changed.

Meanwhile, the position of synapse weight change does not need to be the layer at the rear end, and various modifications are may be made.

Meanwhile, after training for the basic mode is completed, the learning inference processor DRI in the resolution enhancement processor SRU may use it as pre-training of each image quality mode and may perform refine training process only for the changed layer. Accordingly, the result may be obtained with less effort compared to learning the full layer.

Figure 20A:
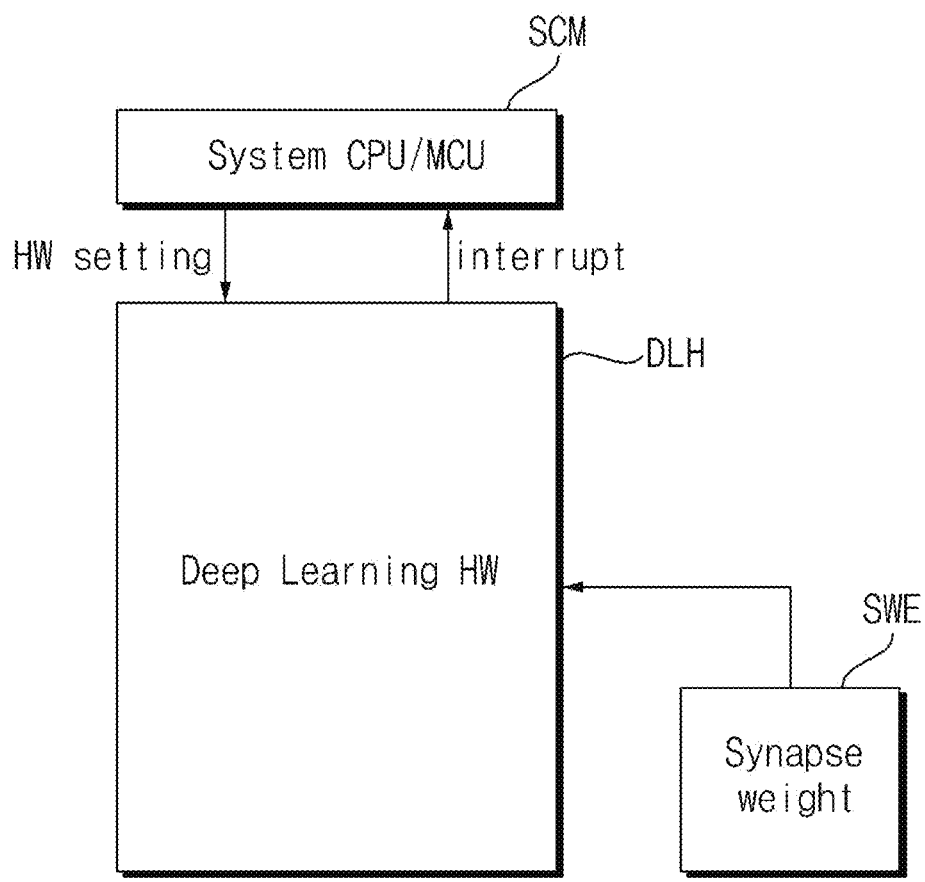
Figure 20B:
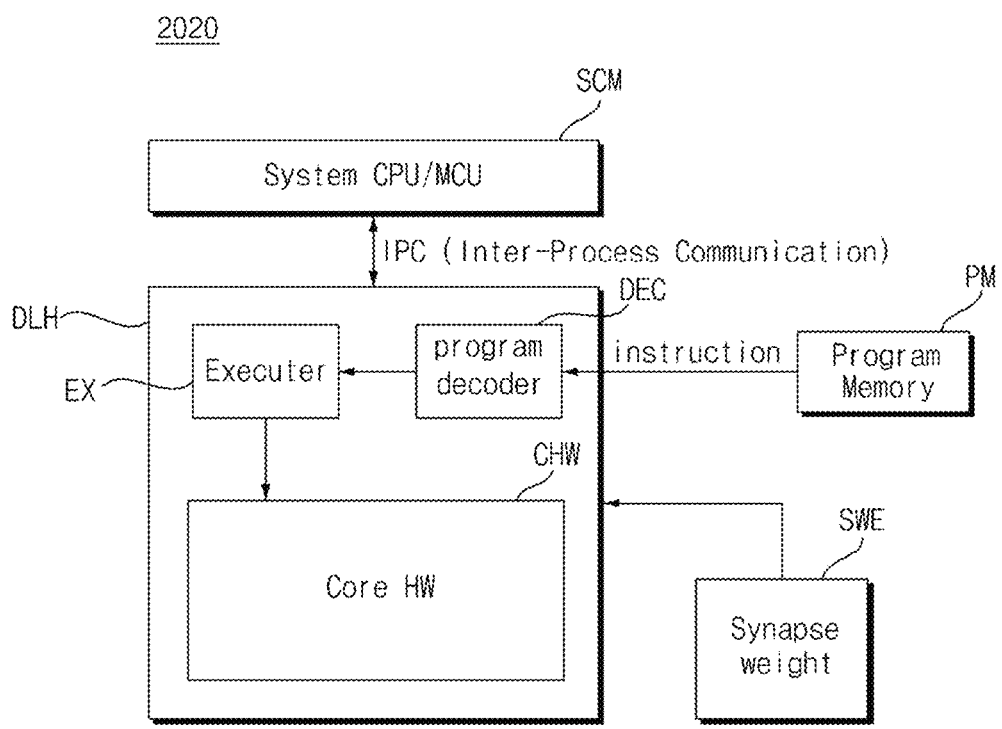

FIGS. 20A and 20B are diagrams reference to illustrate hardware for a learning inference processor operation.

First, referring to FIG. 20A, a hardware 2010 for a learning inference processor operation according to an embodiment of the present disclosure includes a CPU/MCU (SCM), a deep learning module (DLH), and a memory SWE storing synapse weight.

The CPU/MCU (SCM) may receive an interrupt from a deep learning module (DLH) and output a hardware setting for a network model except the synapse weight to the deep learning module DLH based on the interrupt.

Accordingly, the deep learning module DLH may perform deep learning-based learning inference processor based on the hardware setting.

Here, the deep learning module DLH may receive the synapse weight from the memory SWE and perform deep learning-based learning inference processor based on the synapse weight and hardware setting.

Meanwhile, the updated synapse weight is stored in the memory SWE.

Meanwhile, when the network structure is changed, the CPU/MCU (SCM) may change a program for setting the deep learning module DLH.

Next, referring to FIG. 20B, a hardware 2020 for a learning inference processor operation according to an embodiment of the present disclosure may include a CPU/MCU (SCM), a deep learning module (DLH), a storage storing synapse weight, and a program memory (PM).

The deep learning module (DLH) may include a program decoder (DEC) that receives and decodes instructions from the program memory (PM), an executer, and a core hardware (CHW).

Inter process communication (IPC) may be performed between the CPU/MCU (SCM) and the deep learning module (DLH), The deep learning module DLH may receive a synapse weight from the memory SWE and perform deep learning-based learning inference processor based on an instruction from the program memory PM.

Meanwhile, the updated synapse weight is stored in the memory SWE.

Meanwhile, when the network structure is changed, the program stored in the program memory PM may be changed, and the CPU/MCU (SCM) may update information related to the change in the program.

Meanwhile, the hardwares 2010 and 2020 of FIGS. 20A and 20B may be provided in the signal processor 170 described above.

According to the description of FIGS. 9 to 20B, the signal processor 170 and the image display apparatus 100 having the same according to an embodiment of the present disclosure stably improve the resolution even when input images of various resolutions are input.

Meanwhile, resolution may be stably improved even when input images of various resolutions are input but there is no resolution information of the input images Meanwhile, it is possible to stably improve the resolution by using the deep neural network.

Meanwhile, the signal processor 170 and the image display apparatus 100 having the same according to an embodiment of the present disclosure may be updated by applying training based on image characteristics such as a low-illuminance image, an outdoor image, and a sports image in the future by changing the network structure and synapse weight according to the purposes.

The signal processor 170 and the image display apparatus 100 having the same according to an embodiment of the present disclosure may be applied to an 8 KTV, a signage having a plurality of displays, and the like.

Hereinabove, the embodiment of the disclosure have been described but the disclosure is not limited to the specific embodiment and may be variously modified by a person skilled in the art to which the disclosure pertains without departing from the scope of the disclosure as claimed in the appended claims and such modifications should not be individually understood from technical concepts or prospects of the disclosure.

What is claimed is:

1. A signal processing device comprising:
a scaler configured to scale input images of various resolutions to a first resolution; and
a resolution enhancement processor configured to perform learning on the input images having the first resolution and to generate a first image having a second resolution higher than the first resolution,
wherein the resolution enhancement processor comprises a learning inference processor configured to perform learning inference based on the input images having the first resolution and a super resolution learning model,
wherein the learning inference processor includes a first layer fixed regardless of a plurality of image quality modes and a second layer configured to change based on the plurality of image quality modes, and
wherein synapse weights of the second layer are configured to be changed based on each mode of the plurality of image quality modes.

2. The signal processing device of claim 1, wherein the resolution enhancement processor is configured to output a third image having the second resolution based on an input second image having the second resolution and the first image corresponding to a residual image of the second resolution.

3. The signal processing device of claim 2, further comprising:
a second scaler configured to scale the input images of various resolutions into the second resolution,
wherein a second image having the second resolution output from the second scaler is input to the resolution enhancement processor.

4. The signal processing device of claim 2, further comprising:
an image quality processor configured to scale the input images of various resolutions into the second resolution,
wherein a second image having the second resolution output from the image quality processor is input to the resolution enhancement processor.

5. The signal processing device of claim 2, further comprising:
a resolution detector configured to detect a resolution of the input images,
wherein, based on the resolution of the input image detected by the resolution detector being the second resolution, the second image having the second resolution is input to the resolution enhancement processor.

6. The signal processing device of claim 5, wherein, based on the resolution of the input image detected by the resolution detector being the second resolution, the resolution enhancement processor updates a weight in a learning model based on the input image having the first resolution and the second image having the second resolution.

7. The signal processing device of claim 6, further comprising:
a first weight memory configured to store a first weight; and
a second weight memory configured to store a second weight,
wherein the resolution enhancement processor is configured to perform learning using the second weight from the first weight memory and to perform control to store the updated weight in the second weight memory.

8. The signal processing device of claim 2, further comprising:
a resolution detector configured to detect a resolution of the input image,
wherein when the resolution of the input image detected by the resolution detector is not the second resolution, the resolution enhancement processor is configured to receive the input image having the first resolution scaled by the scaler and the second image having the second resolution, to perform learning on the input image having the first resolution, and to output a third image having the second resolution.

9. The signal processing device of claim 2, further comprising:
a resolution detector configured to detect a resolution of the input image; and
a second scaler configured to scale the input image to the second resolution when the resolution of the input image detected by the resolution detector is not the second resolution,
wherein a second image having the second resolution output from the second scaler is input to the resolution enhancement processor.

10. The signal processing device of claim 2, further comprising:
an image quality processor configured to perform image quality processing on the third image output from the resolution enhancement processor.

11. The signal processing device of claim 1, further comprising:
a second resolution enhancement processor configured to perform learning on an image having the second resolution among the input images of various resolutions and to generate a fourth image having the second resolution.

12. The signal processing device of claim 1, wherein the resolution enhancement processor further comprises:
a calculator configured to calculate a difference between a resultant image according to the learning inference processor and a second image having the second resolution to output a third image having the second resolution.

13. The signal processing device of claim 1, wherein the resolution enhancement processor is configured to output a third image having the second resolution based on a difference between a resultant image according to the learning inference processor and a second image having the second resolution.

14. The signal processing device of claim 1, wherein the resolution enhancement processor further comprises:
a calculator configured to calculate a difference value between a resultant image according to the learning inference processor and a second image having the second resolution; and
a learning updating processor configured to perform learning for weight updating based on a node value from the learning inference processor and the difference value.

15. The signal processing device of claim 14, wherein the learning inference processor updates a learning model based on a parameter value from the learning updating processor.

16. The signal processing device of claim 1, wherein
the resolution enhancement processor is configured to perform the learning inference based on the input images having the first resolution and the super resolution learning model, to calculate a difference value between a resultant image according to the learning inference processor and the second image having the second resolution, to perform learning for weight updating based on a node value from the learning inference processor and the difference value, and to update a learning model based on a parameter value output according to a result of weight updating.

17. The signal processing device of claim 1, wherein the second resolution is varied according to a setting.

18. A signal processing device comprising:
a first resolution enhancement processor configured to perform learning on an input image having a first resolution and to generate a first image having a second resolution higher than the first resolution;
a second resolution enhancement processor configured to perform learning on an input image having a third resolution and to generate a second image having the second resolution higher than the third resolution; and
a third resolution enhancement processor configured to perform learning on an input image having the second resolution and to generate a third image having the second resolution,
wherein the first resolution enhancement processor comprises a learning inference processor configured to perform learning inference based on the input image having the first resolution and a super resolution learning model,
wherein the learning inference processor includes a first layer fixed regardless of a plurality of image quality modes and a second layer configured to change based on the plurality of image quality modes, and
wherein synapse weights of the second layer are configured be changed based on each mode of the plurality of image quality modes.

19. The signal processing device of claim 18, further comprising:
a fourth resolution enhancement processor configured to perform learning on an input image having a fourth resolution and to generate a fourth image having the second resolution higher than the fourth resolution.

20. An image display apparatus comprising:
a display; and
a signal processor configured to output an image quality-processed image signal to the display,
wherein the signal processor comprises:
a scaler configured to scale input images of various resolutions to a first resolution; and
a resolution enhancement processor configured to perform learning on the input images having the first resolution and to generate a first image having a second resolution higher than the first resolution,
wherein the resolution enhancement processor comprises a learning inference processor configured to perform learning inference based on the input images having the first resolution and a super resolution learning model,
wherein the learning inference processor includes a first layer fixed regardless of a plurality of image quality modes and a second layer configured to change based on the plurality of image quality modes, and
wherein synapse weights of the second layer are configured to be changed based on each mode of the plurality of image quality modes.

* * * * *